US011695728B2

(12) United States Patent
Bertz et al.

(10) Patent No.: US 11,695,728 B2
(45) Date of Patent: Jul. 4, 2023

(54) DOMAIN NAME SYSTEM (DNS) TRANSLATIONS FOR CO-LOCATED GATEWAY USER PLANES IN WIRELESS COMMUNICATION NETWORKS

(71) Applicant: T-MOBILE INNOVATIONS LLC, Overland Park, KS (US)

(72) Inventors: Lyle T. Bertz, Lee's Summit, MO (US); Brian David Waters, Angel Fire, NM (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 207 days.

(21) Appl. No.: 17/166,458

(22) Filed: Feb. 3, 2021

(65) Prior Publication Data
US 2021/0160211 A1 May 27, 2021

Related U.S. Application Data

(63) Continuation of application No. 16/682,344, filed on Nov. 13, 2019, now Pat. No. 10,951,575.

(51) Int. Cl.
*H04L 61/4511* (2022.01)
*H04B 7/0413* (2017.01)
*H04W 88/16* (2009.01)
*H04L 101/375* (2022.01)

(52) U.S. Cl.
CPC ........ *H04L 61/4511* (2022.05); *H04B 7/0413* (2013.01); *H04W 88/16* (2013.01); *H04L 2101/375* (2022.05)

(58) Field of Classification Search
CPC .......... H04L 61/4511; H04L 2101/375; H04B 7/0413; H04W 88/16; H04W 76/11
See application file for complete search history.

(56) References Cited

U.S. PATENT DOCUMENTS

| 8,064,909 B2 | 11/2011 | Spinelli et al. |
| 8,634,346 B2 | 1/2014 | Velandy et al. |
| 8,665,707 B2 | 3/2014 | Draznin |

(Continued)

FOREIGN PATENT DOCUMENTS

| CN | 107483604 A | 12/2017 |
| WO | 2004088923 A1 | 10/2004 |

(Continued)

*Primary Examiner* — Patrice L Winder

(57) ABSTRACT

To serve User Equipment (UEs) in a wireless communication network, a control-plane transfers a co-located User Plane Function (UPF) request for a wireless access point ID to a naming system. The naming system detects a co-location translation fault for the wireless access point ID and transfers the wireless access point ID to a controller. The controller determines co-located UPFs for the wireless access node. The controller transfers co-location translation information for the wireless access point ID and co-located UPF IDs to the naming system. The control-plane transfers another co-located UPF request for the wireless access point ID to the naming system. The naming system translates the wireless access point ID into the set of co-located UPF IDs. The naming system transfers the co-located UPF IDs to the control-plane. The control-plane signals the co-located UPFs to serve the UE over the wireless access point.

20 Claims, 10 Drawing Sheets

(56) References Cited

U.S. PATENT DOCUMENTS

| | | |
|---|---|---|
| 9,220,110 B2 | 12/2015 | Rune et al. |
| 9,277,538 B2 | 3/2016 | Mihaly et al. |
| 9,351,234 B2 | 5/2016 | Ramie et al. |
| 9,584,466 B2 | 2/2017 | Dragan et al. |
| 9,788,294 B2 | 10/2017 | Miklos et al. |
| 9,811,622 B2 | 11/2017 | Kakadia et al. |
| 9,848,399 B2 | 12/2017 | Roeland |
| 10,069,791 B2 | 9/2018 | Bhaskaran et al. |
| 10,560,914 B2 | 2/2020 | Rommer et al. |
| 10,694,445 B2 | 6/2020 | Albasheir et al. |
| 10,701,600 B2 * | 6/2020 | Larsson ............. H04W 64/003 |
| 10,721,680 B2 | 7/2020 | Kodaypak et al. |
| 10,798,617 B1 | 10/2020 | Ghadge et al. |
| 11,129,061 B1 * | 9/2021 | Allan .................... H04W 76/22 |
| 2006/0259625 A1 | 11/2006 | Landfeldt et al. |
| 2013/0121298 A1 * | 5/2013 | Rune .................. H04L 61/4511 |
| | | 370/329 |
| 2013/0316715 A1 | 11/2013 | Sergeev et al. |
| 2015/0208305 A1 | 7/2015 | Synnergren et al. |
| 2017/0005914 A1 * | 1/2017 | Edge ................... H04L 61/4511 |
| 2017/0150420 A1 * | 5/2017 | Olsson ................... H04W 4/00 |
| 2017/0311244 A1 * | 10/2017 | Kodaypak ............. H04W 48/18 |
| 2018/0013867 A1 | 1/2018 | Bhagwat et al. |
| 2018/0109632 A1 | 4/2018 | Stammers et al. |
| 2018/0191672 A1 | 7/2018 | Torres et al. |
| 2019/0007984 A1 | 1/2019 | Kuroda et al. |
| 2019/0140895 A1 | 5/2019 | Ennis, Jr. et al. |
| 2019/0223076 A1 | 7/2019 | Albasheir et al. |
| 2020/0204984 A1 * | 6/2020 | Dodd-Noble ....... H04L 61/4511 |
| 2020/0252367 A1 * | 8/2020 | Yang ................... H04L 61/4511 |
| 2021/0195507 A1 | 6/2021 | Zhu et al. |
| 2022/0086719 A1 * | 3/2022 | Devlic ................ H04L 41/5051 |

FOREIGN PATENT DOCUMENTS

| | | |
|---|---|---|
| WO | 2012028071 A1 | 3/2012 |
| WO | 2012068946 A1 | 5/2012 |
| WO | 2017162295 A1 | 9/2017 |
| WO | 2019180102 A1 | 9/2019 |

* cited by examiner

DOMAIN NAME SYSTEM (DNS) TRANSLATIONS FOR CO-LOCATED GATEWAY USER PLANES IN WIRELESS COMMUNICATION NETWORKS

RELATED CASES

This United States patent application is a continuation of U.S. patent application Ser. No. 16/682,344 that was filed on Nov. 13, 2019 and is entitled "DOMAIN NAME SYSTEM (DNS) TRANSLATIONS FOR CO-LOCATED GATEWAY USER PLANES IN WIRELESS COMMUNICATION NETWORKS." U.S. patent application Ser. No. 16/682,344 is hereby incorporated by reference into this United States patent application.

TECHNICAL BACKGROUND

Wireless communication networks provide wireless data services to wireless user devices. Exemplary wireless data services include voice calling, internet access, media streaming, machine communications, vehicle control, and social networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Long Term Evolution (LTE), Fifth Generation New Radio (5GNR), and Narrowband Internet of Things (NB IoT). LTE, 5GNR, and NB IoT are described in Third Generation Partnership Project (3GPP) documents.

To obtain the wireless data services, the wireless user devices exchange user data with the wireless access nodes. The wireless access nodes exchange the user data with Access Gateways (A-GWs) which serve the wireless access points. The A-GWs exchange the user data with External Gateways (E-GWs) which anchor external user data communications. The E-GWs exchange the user data with the external systems. Exemplary A-GWs comprise LTE Serving Gateways (S-GWs) and Fifth Generation Core (5GC) Access User Plane Functions (A-UPFs). Exemplary E-GWs comprise 5GC Packet Data Network Gateways (P-GWs) and 5GC External (E-UPFs).

The A-GWs and the E-GWs are separated into a control plane and a user plane. The control plane handles network signaling and directs the user plane in response to requests from the wireless user devices. The user plane handles user data in response to control instructions from the control plane. When a wireless user device requests a wireless data service, the control plane selects a user plane to serve the wireless user device. In response a wireless service request, an A-GW Control Plane (AGW-C) selects an A-GW User Plane (AGW-U), and an E-GW Control Plane (EGW-C) selects an E-GW User Plane (EGW-U).

To select an AGW-U and an EGW-U to serve the wireless user device, the AGW-U and the EGW-U transfer Domain Name System (DNS) messages that requests a translation of a Tracking Area Indicator (TAI) into Identifier (IDs) for an AGW-U and EGW-U. The TAI specifies a geographic area that currently contains the wireless user device. The DNS translates the TAI for the wireless user device into the AGW-U ID and EGW-U ID. The DNS returns the AGW-U ID and the EGW-U ID to the AGW-C and EGW-C. The AGW-C and EGW-C use the IDs to direct the AGW-U and EGW-U to serve the wireless user device. In response, the AGW-U and EGW-U exchange user data for the wireless user device.

In some examples, the DNS uses a Dynamic Data Discovery System (DDDS) to translate the TAI into the AGW-U ID and the EGW-U ID. When using DDDS, the DNS request includes network codes that correlate to services like Local Break-Out (LBO), 5GNR Low-Latency (NR), 5GNR/LTE Dual Connectivity (EN), and System Architecture Evolution Dedicated Core (DC). Thus, the DNS selects the AGW-Us and EGW-Us based on the geographic area and the wireless data service for the wireless user device. DNS and DDDS are described by various Internet Engineering Task Force (IETF) documents.

Unfortunately, some DNS translations may be missing from the DNS. Moreover, the replacement DNS translations do not efficiently identify co-located AGW-Us and EGW-Us or edge AGW-Us and EGW-Us.

TECHNICAL BACKGROUND

To serve User Equipment (UEs) in a wireless communication network, a control-plane transfers a co-located User Plane Function (UPF) request for a wireless access point ID to a naming system. The naming system detects a co-location translation fault for the wireless access point ID and transfers the wireless access point ID to a controller. The controller determines co-located UPFs for the wireless access node. The controller transfers co-location translation information for the wireless access point ID and co-located UPF IDs to the naming system. The control-plane transfers another co-located UPF request for the wireless access point ID to the naming system. The naming system translates the wireless access point ID into the set of co-located UPF IDs. The naming system transfers the co-located UPF IDs to the control-plane. The control-plane signals the co-located UPFs to serve the UE over the wireless access point.

DETAILED DESCRIPTION

Figure 1:
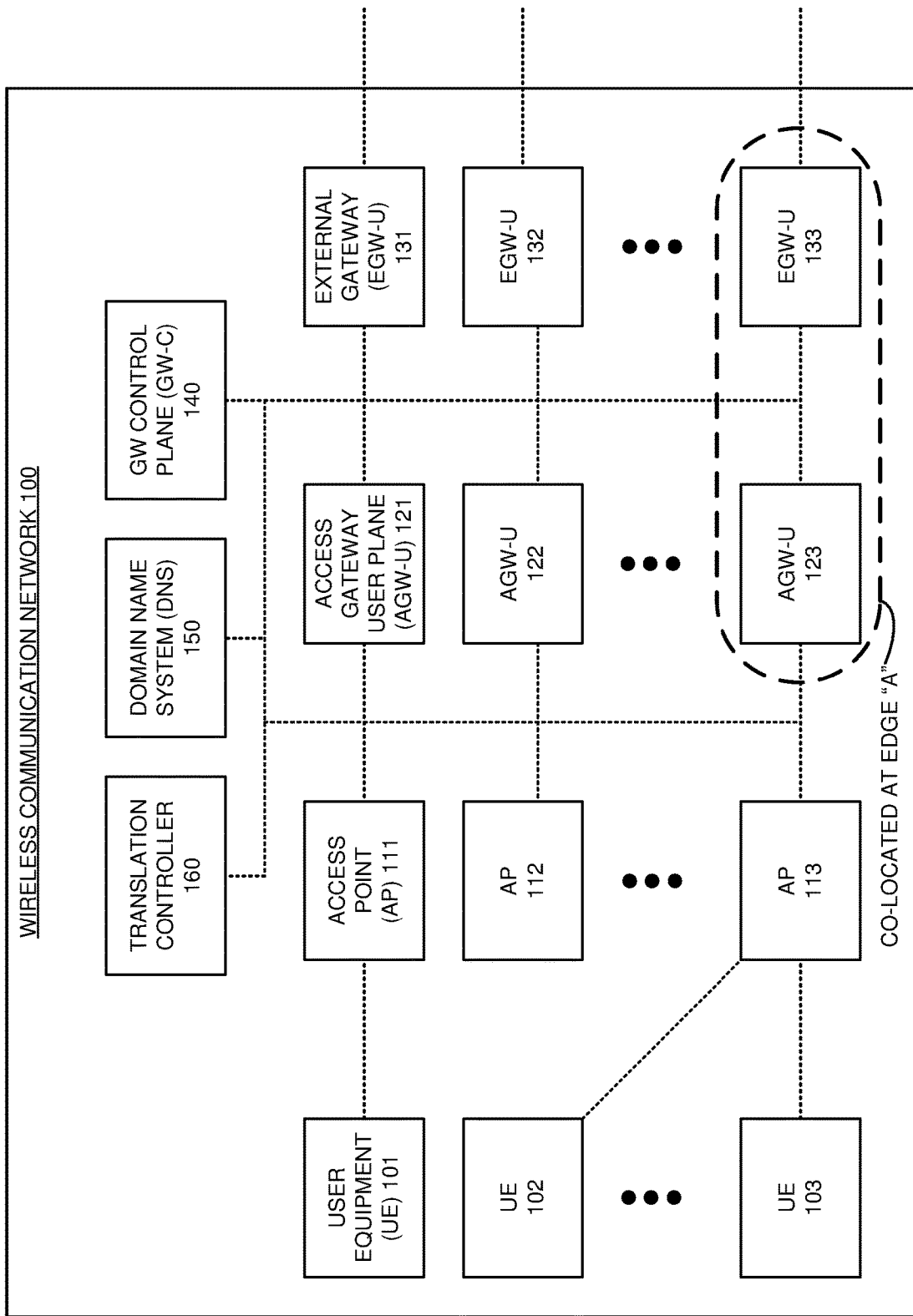
FIG. 1 illustrates a wireless communication network to serve User Equipment (UEs) with data communication services over co-located edge Gateway User Planes (GW-Us).

FIG. 1 illustrates wireless communication network 100 serve User Equipment (UEs) 101-103 with data communication services over co-located Access Gateway User Plane (AGW-U) 123 and External Gateway User Plane (EGW-U) 133. Wireless communication network 100 comprises User Equipment (UEs) 101-103, Access Points (APs) 111-113, AGW-Us 121-123, EGW-Us 131-133, GW Control Plane (GW-C) 140, Domain Name System (DNS) 150, and translation controller 160. Wireless communication network 100 is restricted for clarity and typically includes more UEs, APs, and GWs than the amount shown.

AGW-U 123 and EGW-U 133 are co-located at network edge "A". For example, AGW-U 123 and EGW-U 133 may reside in the same computer, and the computer may be physically adjacent to the computer that hosts part of AP 113. In this context, GW co-location requires the distance between the serving AGW-U and the serving EGW-U to be less than 1000 feet, although the distance is typically much smaller and is often virtualized. In this context, a network edge location requires the distance between the serving AGW-U and the serving AP to be less than 1000 feet, although the distance is typically much smaller and is often virtualized. In a co-located edge location, the AP, AGW-U, and EGW-U are all geographically proximate to one another. In wireless communication network 100, GW-Us 121 and 131 are co-located in an integrated System Architecture Evolution (SAE) GW in a network core. GW-Us 122 and 132 are not co-located. GW-Us 123 and 133 are co-located at the network edge, and thus, AP 113, AGW-U 123, and EGW-U 133 are all close together.

UEs 101-103 are capable of wirelessly linking to APs 111-113 and some UEs handover from one AP to another as they move around. On FIG. 1, UE 101 is shown linked to AP 111 and UEs 102-103 are linked to AP 113. The wireless links may use Institute of Electrical and Electronic Engineer (IEEE) 802.11 (WIFI), Long Term Evolution (LTE), Fifth Generation New Radio (5GNR), Narrowband Internet-of-Things (NB-IoT), or some other wireless protocol. LTE, 5GNR, and NB-IoT are described by Third Generation Partnership Project (3GPP) documents. WIFI, LTE, 5GNR, and NB-IoT may use frequencies in the low-band, mid-band, millimeter-wave band, and/or some other part of the wireless spectrum.

APs 111-113 are linked to AGW-Us 121-123 and GW-C 140 over backhaul links. These backhaul links may use IEEE 802.3 (Ethernet), Time Division Multiplex (TDM), Data Over Cable System Interface Specification (DOCSIS), Internet Protocol (IP) LTE, 5GNR, WIFI, or some other data protocol. These backhaul may be virtualized for co-located APs and AGW-Us. AGW-Us 121-123 are linked to EGW-Us 131-133 over network links. These network links may use Ethernet, TDM, DOCSIS, IP, LTE, 5GNR, WIFI, or some other data protocol. In some examples, the network links are virtualized for co-located AGW-Us and EGW-Us. EGW-Us 131-133 are linked to external data systems like the internet and enterprise networks. GW-C 140, DNS 150, and translation controller 160 are linked together. GW-C 140 is linked to AGW-Us 121-123 and EGW-Us 131-133. Translation controller 160 monitors APs 111-113, AGW-Us 121-123 and EGW-Us 131-133 to detect network topology.

UEs 101-103 comprise user circuitry that interacts with users. UEs 101-103 also comprise radio circuitry that wirelessly communicates with APs 111-113. UEs 101-103 might be phones, computers, robots, sensors, vehicles, drones, data appliances, or some other user apparatus with wireless communication circuitry.

APs 111-113 serve UEs 101-103 with wireless communication services. APs 111-113 comprise antennas, modulators, amplifiers, filters, digital/analog interfaces, microprocessors, memory, software, transceivers, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems, network applications, and virtual components. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used.

In APs 111-113, the microprocessors execute the operating systems and network applications to wirelessly exchange network signaling and user data with UEs 101-103 over the wireless links. The microprocessors execute the operating systems and network applications to exchange network signaling with GW-C 140 and to exchange user data with AGW-Us 121-123 over the backhaul links. APs 111-113 may comprise LTE eNodeBs, NR gNodeBs, WIFI hotspots, NB IoT nodes, and/or some other wireless base stations that serve both UEs and AGW-Us.

AGW-Us 121-123 serve APs 111-113 with core access over the backhaul links. EGW-Us 131-133 communicate with external systems like the internet and enterprise networks. AGW-Us 121-123 and EGW-Us 131-133 comprise microprocessors, memory, software, transceivers, and bus connections. The microprocessors comprise CPUs, GPUs, ASICs, and/or the like. The memory comprises RAM, flash circuitry, disk drives, and/or the like. The memory stores software like operating systems, virtual components, and network functions. AGW-Us 121-123 may comprise User Plane Functions (UPFs), Serving Gateway User Planes (SGW-Us), and/or some other user data handler that serves APs and interacts with EGW-Us. EGW-Us 131-133 may comprise UPFs, Packet Data Network Gateway User Planes (PGW-Us), and/or some other user data handler that serves external systems and interacts with AGW-Us.

AGW-U 121 and EGW-U 131 comprise an integrated SAE GW in a Dedicated SAE Core (DC). DC delivers a specific set of network services based on the individual UE subscription. For example, robot UEs may use a Machine-to-Machine (M2M) DC, vehicle UEs may use a Vehicle-to-X (V2X) DC, and corporate employees may use an enterprise DC. AGW-U 123 supports Local Break-Out (LBO) and low-latency New Radio (NR) with its edge location and co-location with EGW-U 133. EGW-U 133 supports LBO and NR with its edge location and its co-location with AGW-U 123. LBO comprises edge internet-access without traversing the wireless network core. NR comprises Ultra Low Latency (ULL) 5GNR service with very strict timing requirements. Co-located edge AGW-Us and EGW-Us deliver superior LBO and low-latency NR. In some examples, the proximity of AP 113, AGW-U 123, and AGW-U 133 allows the virtualization of the fronthaul, backhaul, and network links. For example, the AP 113 baseband, AGW-U 123, and EGW-U 133 may be hosted in the same computer center to serve exceptional LBO, 5GNR, and BB IoT services.

GW-C 140, DNS 150, and translation controller 160 each comprise microprocessors, memory, software, transceivers, and bus connections. The microprocessors comprise CPUs, GPUs, ASICs, and/or the like. The memory comprises RAM, flash circuitry, disk drives, and/or the like. The memory stores software like operating systems, virtual components, and network functions. GW-C 140 comprises network functions like SAE GW Control Planes (SAE GW-Cs), SGW control planes (SGW-Cs), PGW control planes (PGW-Cs), Access and Mobility Management Functions (AMFs), Session Management Functions (SMFs), Mobility Management Entities (MMEs), and/or some other network controllers that serve UEs over APs. DNS 150 comprises network functions like address databases, resolvers, Dynamic Delegation Discovery System (DDDS) modules, and/or some other network controllers that serve GW-Cs with GW-U IDs. Translation controller 160 comprises network functions like network topology databases, Border Gateway Protocol (BGP) listeners, edge co-location modules, translation engines, and/or some other network controllers that serve DNS with DNS translations for co-located AGW-Us and E-GW-Us.

In operation, UE 101 wirelessly attaches to AP 111, and AP 111 responsively transfers a session request to GW-C 140. GW-C 140 receives the session request from AP 111 for UE 101 and responsively transfers an AGW-U request for UE 101 that has network data and an AP Identifier (ID) for AP 111. The network data indicates Tracking Area Identifier (TAI), network service data, UE information, and/or other communication data. The network service data may indicate Local Break-Out (LBO), low-latency New Radio (NR), LTE/NR Dual Connectivity (EN), Access Point Name (APN), and/or some other network characteristics. The UE information may indicate a type of SAE Dedicated Core (DC), NR, EN, and/or some other UE characteristics.

DNS 150 receives the AGW-U request and translates the AP ID and some network data into an AGW-U ID for AGW-U 121. AGW-U 121 and EGW 131 form an integrated SAE GW in a dedicated SAE core. DNS 150 may translate the AP ID into a data set identifying AGW-Us 121-123 and then select AGW-U 121 based on the "DC" in the network data. DNS 150 transfers an AGW-U response that has the AGW-U ID for AGW-U 121. GW-C 140 receives the AGW-U response and transfers an EGW-U request that has the network data the AGW-U ID for AGW-U 121.

DNS 150 receives the EGW-U request and translates the AGW-U ID for AGW-U 121 and some network data into an EGW-U ID for EGW-U 131. EGW-U 131 is part of the integrated SAE GW in the dedicated SAE core. DNS 150 may translate the AGW-U ID into a data set identifying EGW-Us 131-133 and then select EGW-U 131 based on the "DC" in the network data. DNS 150 transfers an EGW-U response that has the EGW-U ID for EGW-U 131. GW-C 140 receives the EGW-U response and responsively transfers AGW-U control signals using the AGW-U ID and also transfers EGW-U control signals using the EGW-U ID. AP 111 serves UE 101. AGW-U 121 serves UE 101 over AP 111 responsive to the AGW-U control signals. EGW-U 131 serves UE 101 responsive to the EGW-U control signals. Thus, user data flows between UE 101 and external systems over AP 111 and the integrated SAE GW that comprises AGW-U 121 and EGW-U 131.

UE 103 wirelessly attaches to AP 113, and AP 113 responsively transfers a session request to GW-C 140. GW-C 140 receives the session request from AP 113 for UE 103 and responsively transfers an AGW-U request for UE 103 that has network data and an AP ID for AP 113. The network data indicates TAI, network service data, UE information, and/or some other communication data. The network service data may indicate LBO, NR, EN, and/or some other network application. The UE information may indicate DC, NR, EN, and/or some other UE characteristics.

DNS 150 receives the AGW-U request and translates the AP ID and some network data into an AGW-U ID for AGW-U 123. AGW-U 123 supports LBO and is co-located with EGW-U 133 near AP 113. DNS 150 may translate the AP ID into a data set identifying AGW-Us 121-123 and then select AGW-U 123 based on "LBO" in the network data. DNS 150 transfers an AGW-U response that has the AGW-U ID for AGW-U 123. GW-C 140 receives the AGW-U response and transfers an EGW-U request that has the network data the AGW-U ID for AGW-U 123.

DNS 150 receives the EGW-U request and translates the AGW-U ID for AGW-U 123 and some network data into an EGW-U ID for EGW-U 133. EGW-U 133 supports LBO and is co-located with AGW-U 123 at the network edge near AP 113. DNS 150 may translate the AP ID into a data set identifying EGW-Us 131-133 and then select EGW-U 133 based on the LBO and co-location. To detect co-location, DNS 150 detects the same location ID (like "EDGE A") in both the AGW-U ID and in the EGW-U ID. DNS 150 transfers an EGW-U response that has the EGW-U ID for EGW-U 133. GW-C 140 receives the EGW-U response and responsively transfers AGW-U control signals using the AGW-U ID and transfers EGW-U control signals using the EGW-U ID. AP 113 serves UE 103. AGW-U 131 serves UE 103 over AP 113 responsive to the AGW-U control signals. EGW-U 133 serves UE 103 responsive to the EGW-U control signals. Thus, user data flows between UE 103 and external systems over AP 113, AGW-U 123, and EGW-U 133. Moreover, AP 113, AGW-U 123, and EGW-U 133 may be virtualized to serve exceptional LBO or low-latency NR.

UE 102 wirelessly attaches to AP 113, and AP 113 responsively transfers a session request to GW-C 140. GW-C 140 receives the session request from AP 113 for UE 102 and responsively transfers an AGW-U request for UE 102 that has network data and an AP ID for AP 113. The network data indicates TAI, network service data, UE information, and/or some other communication data. The network service data may indicate LBO, NR, EN, and/or some other network application. The UE information may indicate DC, NR, EN, and/or some other UE characteristics.

DNS 150 receives the AGW-U request and translates the AP ID and network data into an AGW-U ID for AGW-U 123. AGW-U 123 supports an NR low-latency service and is co-located with EGW-U 133 at the network edge near AP 113. DNS 150 may translate the AP ID into a data set identifying AGW-Us 121-123 and then select AGW-U 123 based on an NR low-latency service indicated in the network data. DNS 150 transfers an AGW-U response that has the AGW-U ID for AGW-U 123. GW-C 140 receives the AGW-U response and transfers an EGW-U request that has the network data the AGW-U ID for AGW-U 123.

DNS 150 receives the EGW-U request and translates the AGW-U ID for AGW-U 123 and some network data into an EGW-U ID for EGW-U 133. EGW-U 133 supports the NR low-latency service and is co-located with AGW-U 123 at the network edge near AP 113. DNS 150 may translate the AP ID into a data set identifying EGW-Us 131-133 and then select EGW-U 133 based on the NR service indicated in network data. DNS 150 transfers an EGW-U response that has the EGW-U ID for EGW-U 133. GW-C 140 receives the EGW-U response and responsively transfers AGW-U control signals using the AGW-U ID and also transfers EGW-U control signals using the EGW-U ID. AP 113 serves UE 102. AGW-U 131 serves UE 102 over AP 113 responsive to the AGW-U control signals. EGW-U 133 serves UE 102 responsive to the EGW-U control signals. Thus, user data may flow between UEs 102-103 over AP 113, AGW-U 123, and EGW-U 133. Moreover, AP 113, AGW-U 123, and EGW-U 133 may be virtualized together and serve an exceptional NR low-latency service like Vehicle-to-Vehicle (V2V) communications.

Now consider an example where some translations are missing from DNS 150. In particular, the translations of the AP ID for AP 113 are missing. Perhaps AP 113 is new. In this example, UE 102 wirelessly attaches to AP 113, and AP 113 transfers a session request to GW-C 140. GW-C 140 receives the session request from AP 113 for UE 102 and responsively transfers an AGW-U request for UE 102 that has network data and an AP ID for AP 113. GW-C 160 receives a session request from AP 113 for UE 102 and transfers an AGW-U request that indicates the network data for UE 102 and the AP ID for AP 113.

DNS 150 receives the AGW-U request and attempts to translate the AP ID and network data into an AGW-U ID. Since the translations for AP 113 are missing at this point, DNS 150 detects a translation fault for AP 113 and transfers an AGW-U response that indicates a translation fault for the AP 113 ID. GW-C 140 receives the AGW-U response that indicates the translation fault for the AP 113 ID.

In response to the translation fault, GW-C 140 transfers a translation request that has the TAI for UE 102. DNS 150 receives the translation request and translates the TAI into AGW-U IDs for AGW-Us 121-123 and into EGW-U IDs for EGW-Us 131-133. DNS 150 transfers a translation response that indicates the AGW-U IDs and the EGW-U IDs for the TAI. GW-C 140 selects an AGW-U and an EGW-U to serve UE 102 from the list of GW-U IDs from DNS 150. Unfortunately, the TAI translations are not optimized for the network services.

In response to the translation fault, GW-C 140 transfers a translation fault notice that indicates the TAI for UE 102, AP ID for AP 113, and network instructions. In some examples, GW-C 140 caches DNS misses until a DNS miss pattern is established, and then GW-C 140 transfers the translation fault notice for AP 113. Translation controller 160 receives the translation fault notice and transfers a translation request that has the TAI for UE 102. DNS 150 receives the translation request and translates the TAI into AGW-U IDs for AGW-Us 121-123 and into EGW-U IDs for EGW-Us 131-133. DNS 150 transfers a translation response that indicates the AGW-U IDs and the EGW-U IDs for the TAI.

Translation controller 160 receives the translation response and processes the AGW-U IDs and the EGW-U IDs against network topology data to determine co-located groups of the AGW-Us and the EGW-Us. Translation controller 160 also determines whether the co-location is at the network edge or in a dedicated SAE core. Translation controller 160 adds location IDs to the AGW-U IDs and the EGW-U IDs to indicate co-location by having co-located GW-Us share a location ID like "EDGE A" or "CORE B." Translation controller 160 also indicates edge or core proximity by having GW-U IDs use location IDs like "EDGE A" or "CORE B."

Translation Controller 160 adds network data like LBO, NR, EN, or DC to branch the translations for AP 113 based on the network data. DC is branched to integrated SAE core AGW-U 121 and EGW-U 131. LBO and NR are branched to co-located edge AGW-U 123 and EGW-U 133. Translation Controller 160 generates translations of the AP ID for AP 113 into the AGW-U IDs and adds the network data to branch DNS translations to co-located AGW-U IDs and EGW-U IDs as desired. Translation controller 160 transfers the DNS translations to DNS 150. Now when a UE wirelessly attaches to AP 113 for a network service, DNS 150 will translate the AGW-U request that has the AP ID for AP 113 and network data into the AGW-U IDs and the EGW-U IDs that are optimally configured deliver the specific network service as described herein.

Advantageously, translation controller 160 responds to missing DNS translations by effectively generating new DNS translations for co-located and edge AGW-Us 121-123 and EGW-Us 131-133.

Figure 2:
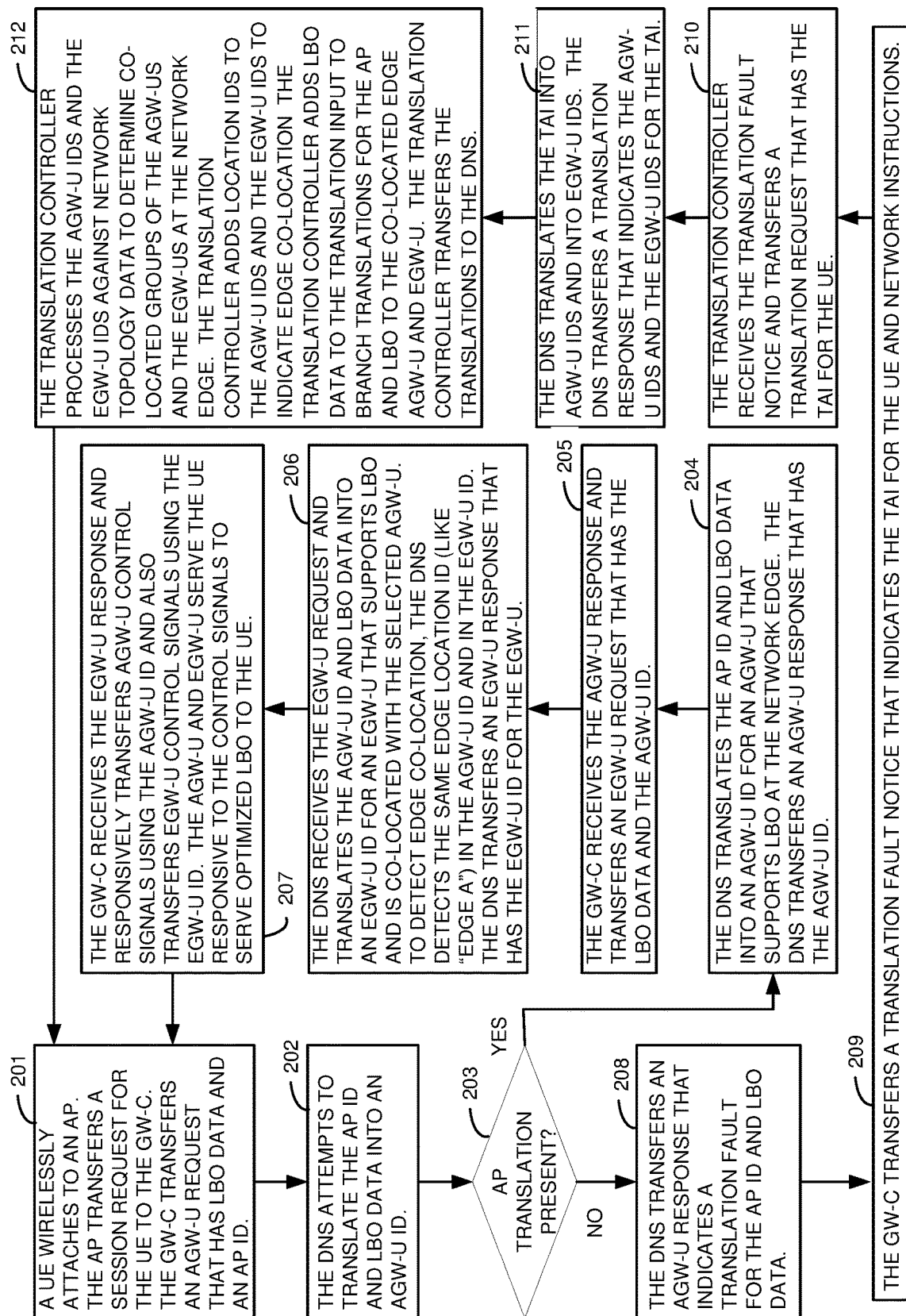
FIG. 2 illustrates the operation of the wireless communication network to serve the UEs with the data communication services over the co-located edge GW-Us.

FIG. 2 illustrates the operation of wireless communication network 100 to serve a UE with LBO service over co-located edge GW-Us. A UE wirelessly attaches to an AP (201). The AP transfers a session request for the UE to the GW-C (201). The GW-C transfers an AGW-U request to a DNS that has LBO data and an AP ID (201). The DNS attempts to translate the AP ID and LBO data into an AGW-U ID (202). If the AP ID translation is present (203), the DNS translates the AP ID and LBO data into an AGW-U ID for an AGW-U that supports LBO at the network edge (204). The DNS transfers an AGW-U response that has the AGW-U ID (204).

The GW-C receives the AGW-U response and transfers an EGW-U request that has the LBO data and the AGW-U ID (205). The DNS receives the EGW-U request and translates the AGW-U ID and LBO data into an EGW-U ID for an EGW-U that supports LBO and is co-located with the selected AGW-U (206). To detect edge co-location, the DNS detects the same edge location ID (like "EDGE A") in the AGW-U ID and in the EGW-U ID (206). The DNS transfers an EGW-U response that has the EGW-U ID for the EGW-U (206). The GW-C receives the EGW-U response and responsively transfers AGW-U control signals using the AGW-U ID and transfers EGW-U control signals using the EGW-U ID (207). The AGW-U and EGW-U serve the UE responsive to the control signals to serve optimized LBO to the UE (207). The operation repeats (201).

If the AP translation is missing from the DNS (203), the DNS transfers an AGW-U response to the GW-C that indicates a translation fault for the AP ID and network instructions (208). The GW-C transfers a translation fault notice that indicates the TAI for the UE and the LBO data (209). The translation controller receives the translation fault notice and transfers a translation request that has the TAI for the UE to the DNS (210). The DNS translates the TAI into AGW-U IDs and into EGW-U IDs (211). The DNS transfers a translation response that indicates the AGW-U IDs and the EGW-U IDs for the TAI (211).

The translation controller processes the AGW-U IDs and the EGW-U IDs against network topology data to determine co-located groups of the AGW-Us and the EGW-Us at the network edge (212). The translation controller adds location IDs to the AGW-U IDs and the EGW-U IDs to indicate edge co-location by having co-located GW-Us share a location ID like "EDGE 113" (212). The translation controller adds LBO data to the translation input to branch the translations for AP 113 and LBO to co-located edge AGW-Us and EGW-Us (212). The generation of translations for network services like NR, EN, and DC would be similar. The translation controller transfers the translations to the DNS (212) and the operation repeats (201).

Although not shown for clarity, the GW-C transfers a translation request with the TAI to the DNS in response to the translation fault. The DNS translates the TAI into AGW-U IDs and into EGW-U IDs and transfers a translation response that indicates the AGW-U IDs and the EGW-U IDs for the TAI. The GW-C selects an AGW-U ID and an EGW-U ID for the UE from the translation response. The GW-C transfers AGW-U control signals using the AGW-U ID and transfers EGW-U control signals using the EGW-U ID. The AGW-U and EGW-U serve the UE responsive to the control signals. Unfortunately, the TAI translations for the AP are not optimized for the network services.

Figure 3:
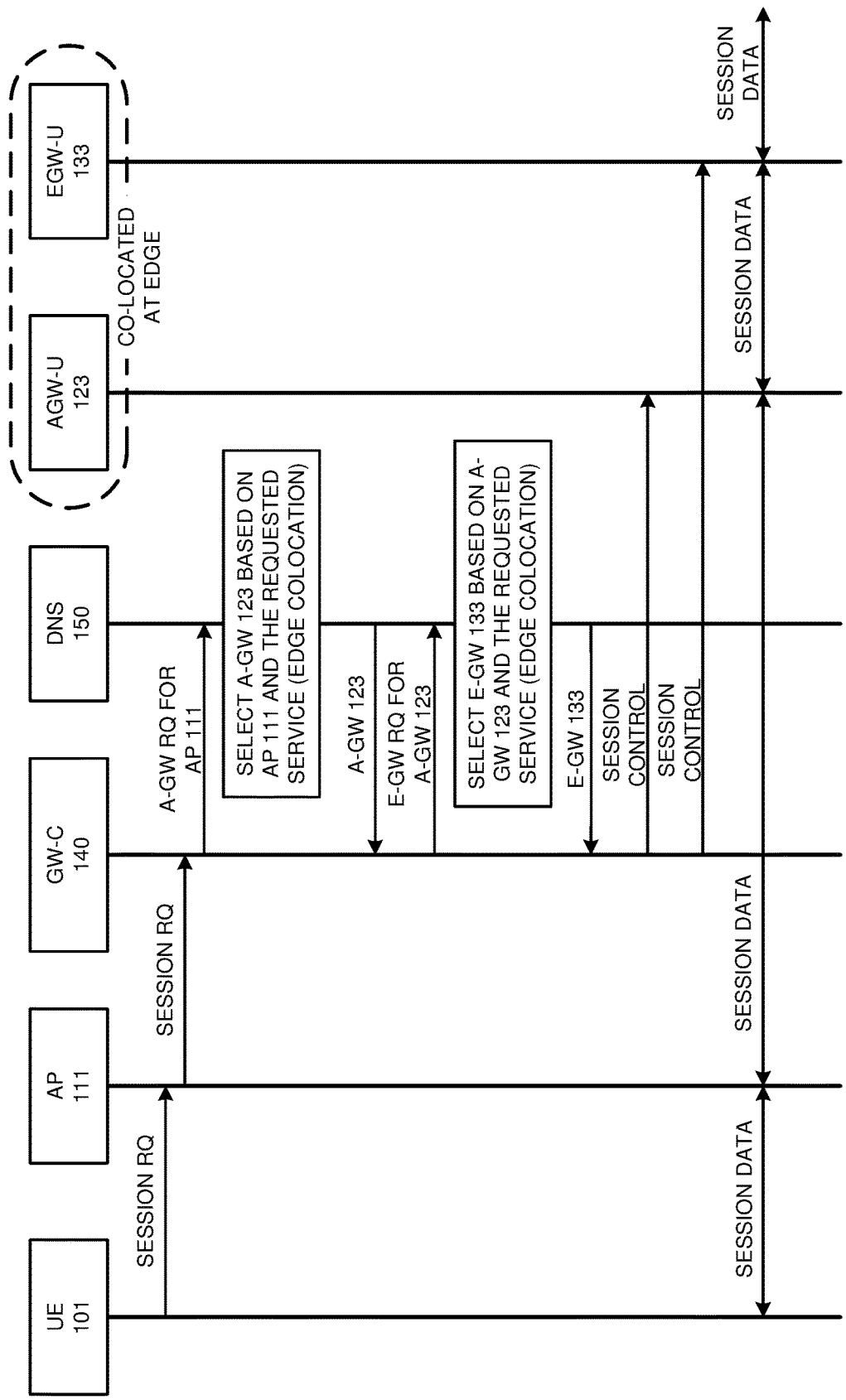
FIG. 3 illustrates the operation of the wireless communication network to serve the UEs with the data communication services over the co-located edge GW-Us.

FIG. 3 illustrates the operation of wireless communication network 100 to serve UE 101 with data communication services over co-located edge GW-Us 123 and 133. UE 101 wirelessly attaches to AP 111, and AP 111 responsively transfers a session request (RQ) to GW-C 140. GW-C 140 responsively transfers an AGW-U request that has the AP ID for AP 111 and network data that indicates the TAI for UE 102 and a special network service. The special network service (like LBO or low-latency NR) is optimized by using co-located edge GW-Us.

DNS 150 receives the AGW-U request and translates the AP ID for AP 111 and a special network service ID into an AGW-U ID for AGW-U 123. AGW-U 123 supports the special network service and is located near AP 111. For example, DNS 150 may translate the AP ID into a set of AGW-Us 121-123 and then select AGW-U 123 based on an LBO indicator in the network data. DNS 150 transfers an AGW-U response that has the AGW-U ID for AGW-U 123. GW-C 140 receives the AGW-U response and transfers an EGW-U request that has the network data the AGW-U ID for AGW-U 123.

DNS 150 receives the EGW-U request and translates the AGW-U ID for AGW-U 123 and the special network service ID into an EGW-U ID for EGW-U 133. EGW-U 133 supports the special network service and is co-located with AGW-U 123 at the network edge. DNS 150 may translate the AGW-U ID into a set of EGW-Us 131-133 and then select co-located EGW-U 133 based on an LBO indication in the network data. To determine co-location, DNS 150 detects the same location ID (like "EDGE 111") in both the AGW-U ID and in the EGW-U ID. DNS 150 transfers an EGW-U response that has the EGW-U ID for co-located EGW-U 133. GW-C 140 receives the EGW-U response and responsively transfers AGW-U control signals using the AGW-U ID and transfers EGW-U control signals using the EGW-U ID. AP 111 serves UE 101. AGW-U 123 serves UE 101 responsive to the AGW-U control signals. EGW-U 133 serves UE 101 responsive to the EGW-U control signals. Thus, user session data flows between UE 101 and external systems over AP 111, AGW-U 123, and EGW-U 133. Moreover, AP 111, AGW-U 123, and EGW-U 133 may be virtualized together to serve exceptional LBO.

Figure 4:
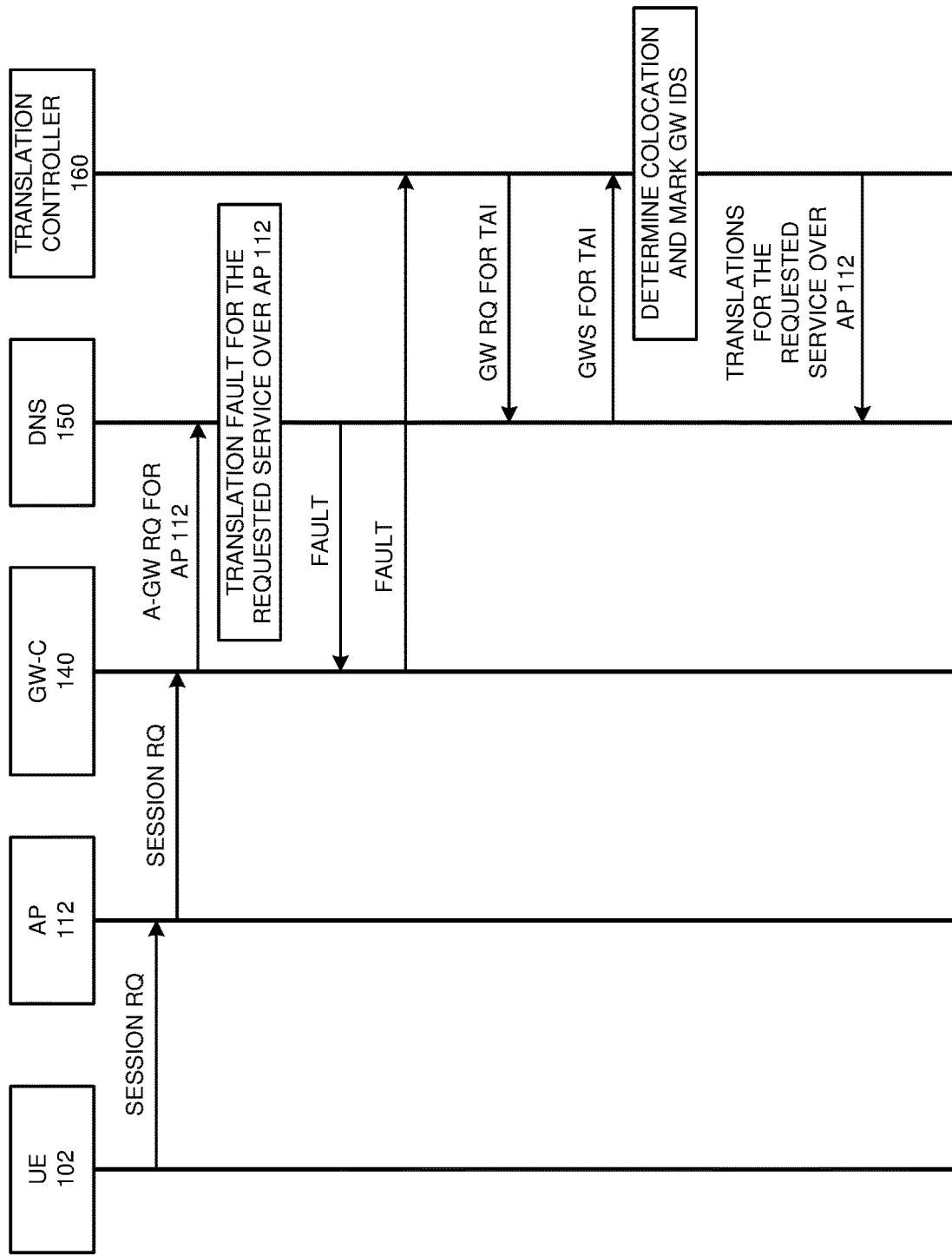
FIG. 4 illustrates the operation of the wireless communication network to generate Domain Name System (DNS) translations for the co-located edge GW-Us.
Figure 5:
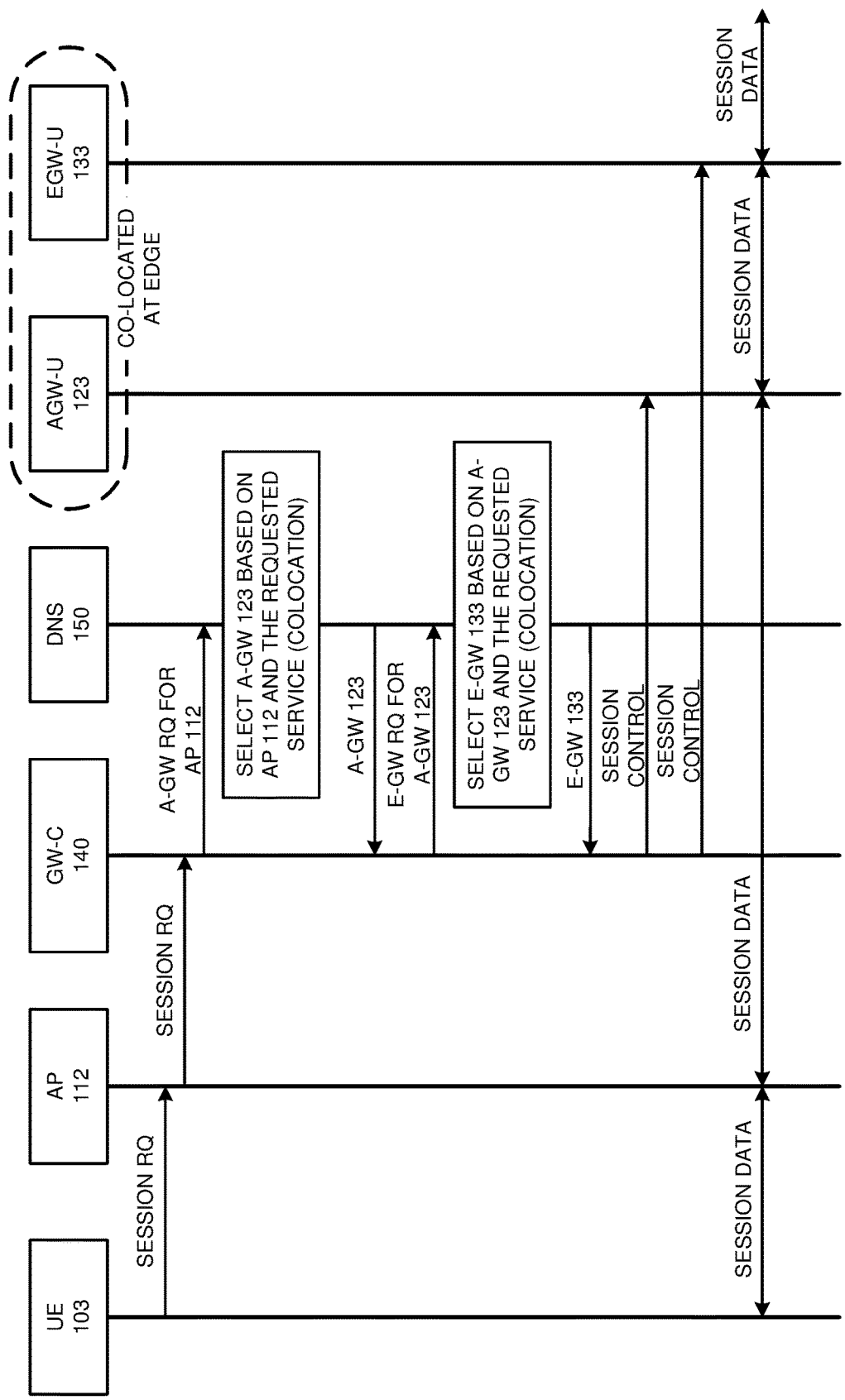
FIG. 5 illustrates the operation of the wireless communication network to serve the UEs with the data communication services over the co-located edge GW-Us.

FIGS. 4-5 illustrate the operation of wireless communication network 100 to generate DNS translations for AP 112 and co-located edge GW-Us 123 and 133 to serve UE 103 with the special network service. The special network service is optimized by using co-located edge GW-Us 123 and 133, but the translations for AP 112 are missing from DNS 150.

Referring to FIG. 4, UE 102 wirelessly attaches to AP 112, and AP 112 transfers a session request to GW-C 140. GW-C 140 receives the session request from AP 112 and responsively transfers an AGW-U request that indicates the special network service and the AP ID for AP 112. DNS 150 receives the AGW-U request and attempts to translate the AP ID for AP 112 into an AGW-U ID. Since these translations are currently missing, DNS 150 detects a translation fault and transfers an AGW-U response that indicates the translation fault for AP 112. GW-C 140 receives the AGW-U response that indicates the translation fault for AP 112.

In response to the translation fault, GW-C 140 transfers a translation fault notice that indicates the TAI for UE 102, the AP ID for AP 112, and network service instructions. Translation controller 160 receives the translation fault notice and transfers a translation request to DNS 150 that has the TAI for UE 102. DNS 150 receives the translation request and translates the TAI into AGW-U IDs for AGW-Us 121-123 and into EGW-U IDs for EGW-Us 131-133. DNS 150 transfers a translation response that indicates the AGW-U IDs and the EGW-U IDs for the TAI of UE 102.

Translation controller 160 receives the translation response and processes the AGW-U IDs and the EGW-U IDs against network topology data to determine co-located groups of the AGW-Us and the EGW-Us. Translation controller 160 also determines whether the co-location is at the network edge. To determine edge location and co-location, translation controller 160 monitors wireless communication network 100 to discover communication links between APs, AGW-Us, and EGW-Us. Translation controller 160 then enters a network topology database to identify geographic information for the linked APs, AGW-Us, and EGW-Us. The geographic information could be geographic coordinates, data center IDs, computer system IDs, and/or the like. Translation controller 160 processes the geographic information for the APs, AGW-Us, and EGW-Us to detect co-located AGW-Us and EGW-Us and to detect their proximity the APs.

Translation controller 160 adds location IDs to the AGW-U IDs and to the EGW-U IDs to indicate edge co-location by having co-located edge GW-Us share an edge location ID like "EDGE 112." Translation controller 160 also adds the special network service data (like LBO or NR) to branch the translations for AP 112 and the special network service to AGW-U 123 and EGW-U 133 which are co-located at EDGE 112. Translation controller 160 transfers the translations for AP 112 to DNS 160. DNS 160 may now use the translations to serve UEs like UE 103.

Referring to FIG. 5, UE 103 wirelessly attaches to AP 112, and AP 112 responsively transfers a session request to GW-C 140. GW-C 140 responsively transfers an AGW-U request that has the AP ID for AP 112 and network data that indicates the special network service that is optimized by using co-located edge GW-Us. DNS 150 receives the AGW-U request and translates the AP ID for AP 112 and the special network service ID into an AGW-U ID for AGW-U 123. AGW-U 123 supports the special network service and is located near AP 112. For example, DNS 150 may translate the AP ID into a set of AGW-Us 121-123 and then select AGW-U 123 based on an LBO indicator in the AGW-U request. DNS 150 transfers an AGW-U response that has the AGW-U ID for AGW-U 123. GW-C 140 receives the AGW-U response and transfers an EGW-U request that has the network data the AGW-U ID for AGW-U 123.

DNS 150 receives the EGW-U request and translates the AGW-U ID for AGW-U 123 and the special network service ID into an EGW-U ID for EGW-U 133. EGW-U 133 supports the special network service and is co-located with AGW-U 123 at the network edge. DNS 150 may translate the AGW-U ID into a set of EGW-Us 131-133 and then select co-located EGW-U 133 based on the LBO indication in the network data and the shared location ID (EDGE 112) in both the AGW-U ID and in the EGW-U ID. DNS 150 transfers an EGW-U response that has the EGW-U ID for co-located edge EGW-U 133.

GW-C 140 receives the EGW-U response and responsively transfers AGW-U control signals using the AGW-U ID and transfers EGW-U control signals using the EGW-U ID. AP 112 serves UE 103. AGW-U 123 serves UE 103 responsive to the AGW-U control signals. EGW-U 133 serves UE 103 responsive to the EGW-U control signals. Thus, user session data flows between UE 103 and external systems over AP 112, AGW-U 123, and EGW-U 133. Moreover, AP 112, AGW-U 123, and EGW-U 133 may be virtualized together to optimally serve the special network service.

Figure 6:
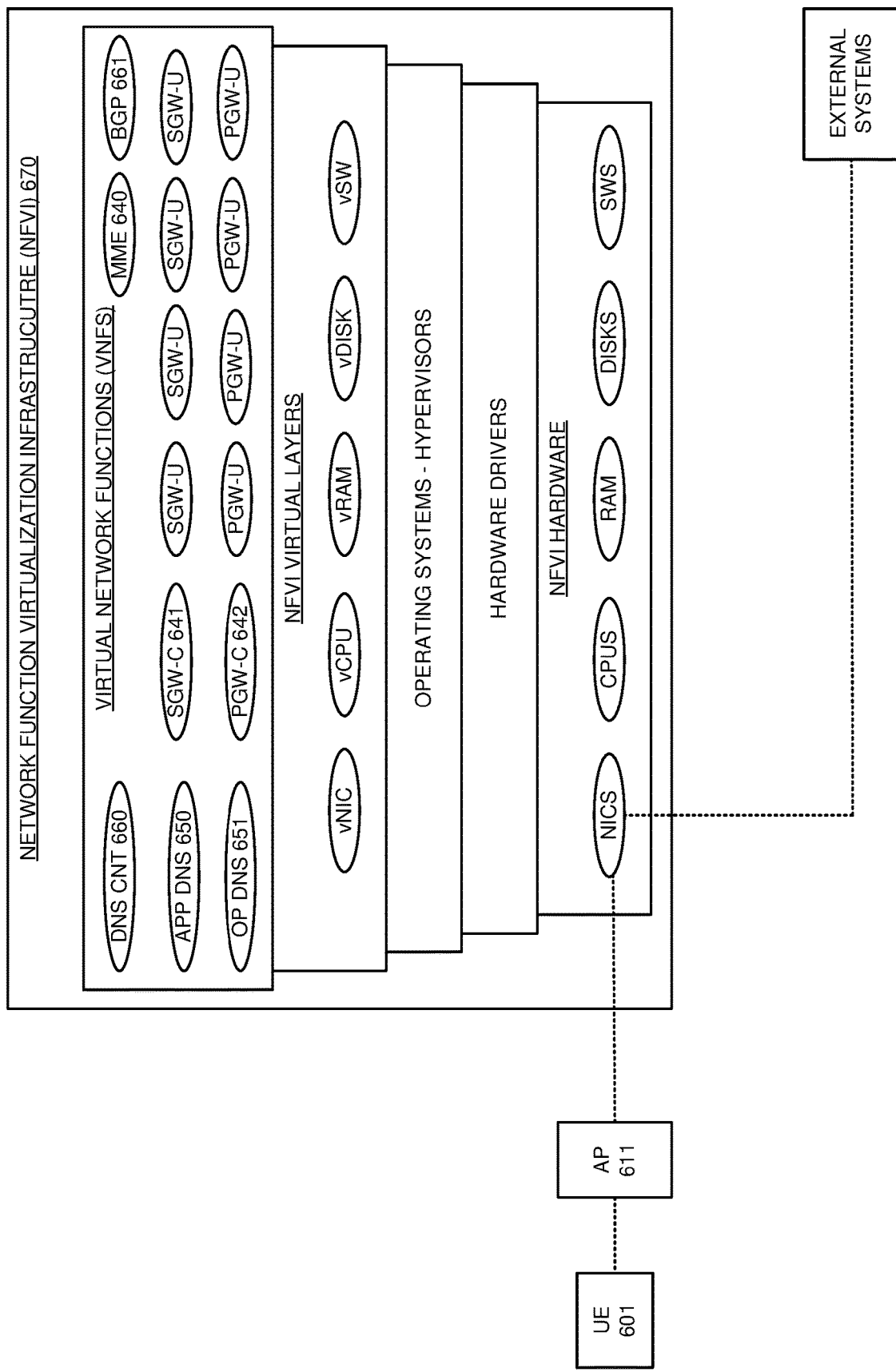
FIG. 6 illustrates a Network Function Virtualization Infrastructure (NFVI) to serve a UE with data communication services over co-located GW-Us.

FIG. 6 illustrates Network Function Virtualization Infrastructure (NFVI) 670 to serve UE 601 with data communication services over co-located GW-Us. NFVI 670 is an example of AGW-Us 121-123, EGW-Us 131-133, GW-C 140, DNS 150, and translation controller 160, although these components may vary from NFVI 670. NFVI 670 may have an edge location, core location, and/or some other location. NFVI 670 may use a single location or be distributed across multiple locations. NFVI 670 comprises NFVI hardware, hardware drivers, operating systems and hypervisors, NFVI virtual layers, and Virtual Network Functions (VNFs). The NFVI hardware comprises Network Interface Cards (NICs), CPUs, RAM, disk storage, and data switches (SWS). The virtual layers comprise virtual NICs (vNIC), virtual CPUs (vCPU), virtual RAM (vRAM), virtual Disk Storage (vDISK), and virtual Switches (vSW). The VNFs comprise Mobility Management Entity (MME) 640, Serving Gateway Control Plane (SGW-C) 641, Packet Data Network Gateway Control Plane (PGW-C) 642, SGW User Planes (SGW-Us), PGW User Planes (PGW-Us), Application (APP) DNS 650, Operator (OP) DNS 651, DNS manager 660, and Border Gateway Protocol (BGP) listener 661.

MME 640, SGW-C 641, and PGW-C 642 comprise an example of GW-C 140, although GW-C 140 may differ. APP DNS 650 and OP DNS 651 comprise an example of DNS 150, although DNS 150 may differ. DNS manager 660 and BGP listener 661 comprise an example of translation controller 160, although translation controller 160 may differ. In some example an Access and Mobility Management Function (AMF) could replace or supplement MME 640. Other VNFs are typically present like Policy Control Function (PCF), Session Management Function (SMF), Authentication and Security Function (AUSF), Unified Data Management (UDM), Network Slice Selection Function (NSSF), Network Repository Function (NRF), Network Exposure Function (NEF), and User Plane Function (UPF). The NFVI hardware executes the hardware drivers, operating systems, hypervisors, virtual layers, and VNFs to serve UE 601 over AP 611.

In operation, UE 601 wirelessly attaches to AP 611, and AP 611 transfers an initial UE message to MME 640. MME 643 interacts with UE 601 and other VNFs to authenticate and authorize UE 601 and to select a service like LBO, NR, EN, or DC. MME 640 selects SGW-C 641 and PGW-C 642 based on the selected service, UE 601 TAI, AP 611 ID, and/or some other factors. MME 640 transfers a create session request for UE 601 to SGW-C 641. The create session request has the AP 611 ID and network data like LBO, NR, EN, or DC. In response to the create session request, SGW-C 641 transfers an SGW-U request to APP DNS 650. The SGW-U request has the AP 611 ID and the network data.

APP DNS 650 receives the SGW-U request having the AP 611 ID and the network data. APP DNS 650 and SGW-C 641 perform a Dynamic Delegation Discovery System (DDDS) session to translate the AP ID and the network data into the SGW-U ID. In response to the network data like LBO, APP DNS 650 may select an SGW-U ID that has an edge location ID for AP 611. In response to the network data like DC, APP DNS 650 may select an SGW-U ID that has an SAE core ID.

APP DNS 650 transfers an SGW-U response that has the SGW-U ID for the selected SGW-U. SGW-C 641 receives the SGW-U response and uses the SGW-U ID to transfer SGW-U control signaling to the selected SGW-U to support the session. SGW-C 641 also transfers a create session request for UE 601 to PGW-C 642. The create session request has the SGW-U ID, AP 611 ID, and network data like LBO, NR, EN, or DC. PGW-C 642 receives the create session request and transfers a PGW-U request to APP DNS 650. The PGW-U request has the SGW-U ID and the network data.

APP DNS 650 receives the PGW-U request having the SGW-U ID and the network data. APP DNS 650 and PGW-C 642 perform a DDDS session to translate the SGW-ID and the network data into the PGW-U ID. In response to the network data that indicates a preference for co-location, APP DNS 650 may select a PGW-U ID that shares a location ID with the SGW-U ID. In response to the network data, APP DNS 650 may select a PGW-U ID that shares the SAE core ID with the SGW-U ID. APP DNS 650 transfers a PGW-U response that has the PGW-U ID. PGW-C 642 receives the PGW-U response and uses the PGW-U ID to transfer PGW-U control signaling to the selected PGW-U to support the session.

AP 611 wirelessly serves UE 601. The selected SGW-U and PGW-U serve UE 601 over AP 611 responsive to the control signals. Thus, user data flows between UE 601 and the external systems over AP 611 and the selected SGW-U and PGW-U. In examples where NFVI 670 is located at the edge next to AP 611, the selected SGW-U and PGW-U serve excellent LBO and NR services to UE 601. In examples where NFVI 670 is located in the core, the selected SGW-U and PGW-U serve excellent DC services to UE 601.

To generate the DNS translations for AP 611, UE 601 (or another UE) wirelessly attaches to AP 611, and AP 611 transfers a session request to MME 640. MME 640 authenticates, authorizes, selects a service for UE 611. MME 640 transfers a create session request to SGW-C 641. SGW-C 641 receives the session request from AP 611 and transfers an SGW-U request that indicates the AP 611 ID and the network data. DNS 150 receives the SGW-U request and attempts to translate the AP ID for AP 611 into an SGW-U ID. Since the translations for AP 611 are missing, APP DNS 650 detects a translation fault and transfers an SGW-U response that indicates the translation fault for AP 611.

SGW-C 641 receives the SGW-U response that indicates the translation fault for AP 611. In response, SGW-C 641 and PGW-C 642 transfer GW-U requests to OP DNS 651 to translate the TAI for UE 601 into an SGW-U ID and a PGW-U ID. OP DNS 651 translates the TAI for UE 601 into an SGW-U ID and a PGW-U ID and returns the IDs to SGW-C 641 and PGW-C 642. SGW-C 641 and PGW-C 642 use the selected GW-U IDs to select and control an SGW-U and PGW-U which serve UE 601 over AP 611. Unfortunately, the TAI translations are not optimized for the network service.

Also in response to the translation fault, SGW-C 640 transfers a translation fault notice that indicates the TAI for UE 601, the AP ID for AP 611, and processing instructions for network codes like LBO, NR, EN, and DC. In some examples, SGW-C 640 caches DNS misses until a DNS miss pattern is established for AP 611, and then SGW-C 640 transfers the translation fault notice for AP 611. DNS controller (CNT) 660 receives the translation fault notice and transfers a translation request to OP DNS 651 that has the TAI for UE 601. OP DNS 651 receives the translation request and translates the TAI into SGW-U IDs and PGW-U IDs. OP DNS 651 transfers a translation response that indicates the SGW-U IDs and the PGW-U IDs for the TAI of UE 601.

DNS controller 660 receives the translation response and processes the SGW-U IDs and the PGW-U IDs against network topology data to determine co-located groups of the SGW-Us and PGW-Us. DNS controller 660 also determines whether the co-location is at the network edge or in a dedicated SAE core. To determine edge and core co-location, BGP listener 661 monitors network traffic to discover communication links between AP 611, the SGW-Us, and the PGW-Us. DNS controller 660 then enters a network topology database to identify geographic information for AP 611 and any detected SGW-Us and PGW-Us. The geographic information could be geographic coordinates, location IDs, NFVI IDs, and/or the like. DNS controller 660 processes the geographic information for AP 611, the SGW-Us, and the PGW-Us to detect co-located SGW-Us and PGW-Us. DNS controller 660 also processes the geographic information to detect edge proximity to AP 611.

To indicate edge co-location where detected, DNS controller 660 adds a shared location ID for AP 611 like "EDGE 611" to the co-located SGW-U IDs and PGW-U IDs. Per the service instructions, DNS controller 660 also adds network data (like LBO, NR, EN, or DC) to branch the translations for AP 611 based on the network data. For example, LBO and NR nodes are added to translate the AP 611 ID into co-located edge GW-Us when LBO or NR network data is provided. DC nodes are added to translate the AP 611 ID into SAE core GW-Us when DC is provided. DNS controller 660 transfers the translations for AP 611 to APP DNS 650. APP DNS 650 may now use the translations to serve UE 601 and other UEs over AP 611 with optimized services like LBO, NR, EN, and DC.

Figure 7:
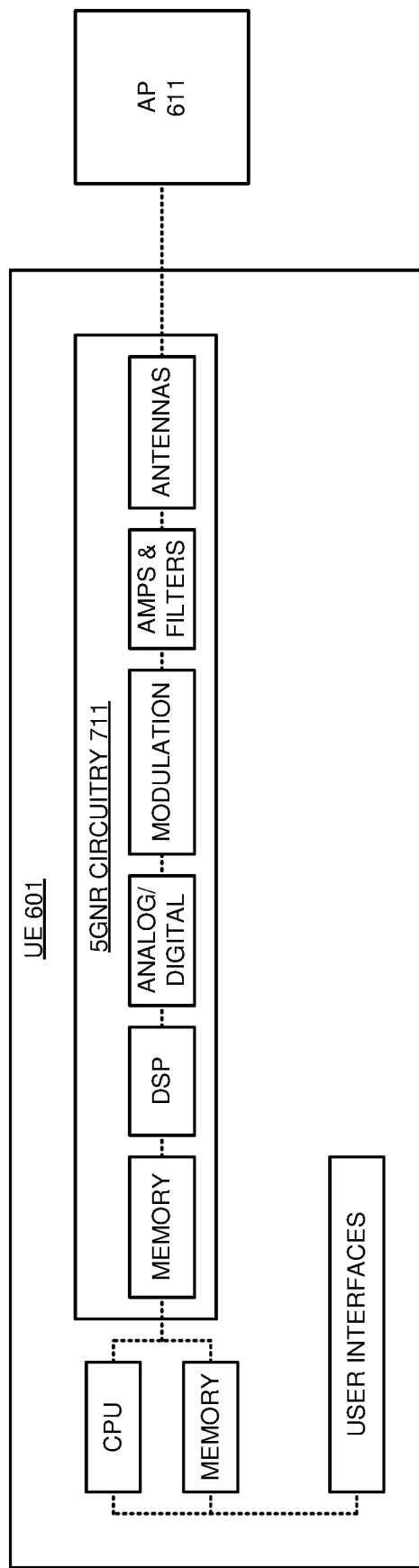
FIG. 7 illustrates the UE that receives the data communication services over the co-located GW-Us.

FIG. 7 illustrates UE 601 that receives the data communication services over co-located GW-Us. UE 601 is an example of UEs 101-103, although UEs 101-103 may differ. UE 601 comprises Fifth Generation New Radio (5GNR) circuitry 711, CPU, memory, and user interfaces which are interconnected over bus circuitry. 5GNR circuitry 711 comprises antennas, amplifiers, filters, modulation, analog-to-digital interfaces, DSP, and memory that are coupled over bus circuitry. The antennas in UE 601 are coupled to AP 611 over wireless 5GNR links. The user interfaces comprise graphic displays, machine controllers, sensors, cameras, transceivers, and/or some other user components. The memories store operating systems, user applications, and network applications. The network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP). The CPU executes the operating systems, user applications, and network applications to exchange network signaling and user data with AP 611 over 5GNR circuitry 711 and the 5GNR links.

In UE 601, the CPU receives Uplink (UL) user data and signaling from the user applications and transfers user data and signaling to memory. The CPU executes the 5GNR network applications to process the UL user data and signaling and Downlink (DL) 5GNR signaling to generate UL 5GNR symbols that carry 5GNR data and RRC/N1 signaling. The 5GNR RRC/N1 signaling may have network data like LBO, NR, EN, DC, and the like, although other codes might be used.

In 5GNR circuitry 711, the DSP processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequencies. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL RRC/N1 signaling and 5GNR data to AP 611.

In 5GNR circuitry 711, the antennas receive wireless signals from AP 611 that transport Downlink (DL) RRC/N1 signaling and 5GNR data. The DL RRC/N1 signaling and 5GNR data may implement a network service like LBO, NR, EN, or DC. The antennas transfer corresponding electrical DL signals through duplexers to the amplifiers. The amplifiers boost the received DL signals for filters which attenuate unwanted energy. In modulation, demodulators down-convert the DL signals from their carrier frequencies. The analog/digital interfaces convert the analog DL signals into digital DL signals for the DSP. The DSP recovers DL 5GNR symbols from the DL digital signals. The DSP transfer the DL 5GNR symbols to memory. The CPUs execute the 5GNR network applications to process the DL 5GNR symbols and recover the DL RRC/N1 signaling and 5GNR data. The CPUs transfer corresponding user data and signaling to the user applications. The user applications process the DL user data and signaling to interact with the user interfaces. For example, a robot controller may drive a manufacturing robot.

In UE 601, the RRC network application exchanges user signaling with the user applications. The SDAP network application exchanges user data with the user applications. The RRC processes the UL user signaling and DL RRC/N1 signaling to generate DL user signaling and UL RRC/N1 signaling. The SDAP interworks between user data and 5GNR data and exchanges the user data with the user applications. The RRC maps between RRC/N1 signaling and Service Data Units (SDUs). The SDAP maps between the 5GNR data and SDUs. The RRC and SDAP exchanges their SDUs with the PDCP. The PDCP maps between the SDUs and PDUs. The PDCP exchanges the PDUs with the RLC. The RLC maps between the PDUs and MAC logical channels. The RLC exchanges the RRC/N1 signaling and 5GNR data with the MAC over the MAC logical channels. The MAC maps between the MAC logical channels and MAC transport channels. The MAC exchanges the RRC/N1 signaling and 5GNR data with the PHYs over the MAC transport channels. The PHYs maps between the MAC transport channels and PHY transport channels. The PHY exchanges the 5GNR RRC/N1 signaling and 5GNR data with the PHYs in the AP 611 over the PHY transport channels in the 5GNR wireless links.

RRC functions comprise authentication, security, handover control, status reporting, Quality-of-Service (QoS), network broadcasts and pages, and network selection. SDAP functions comprise QoS marking and flow control. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 8:
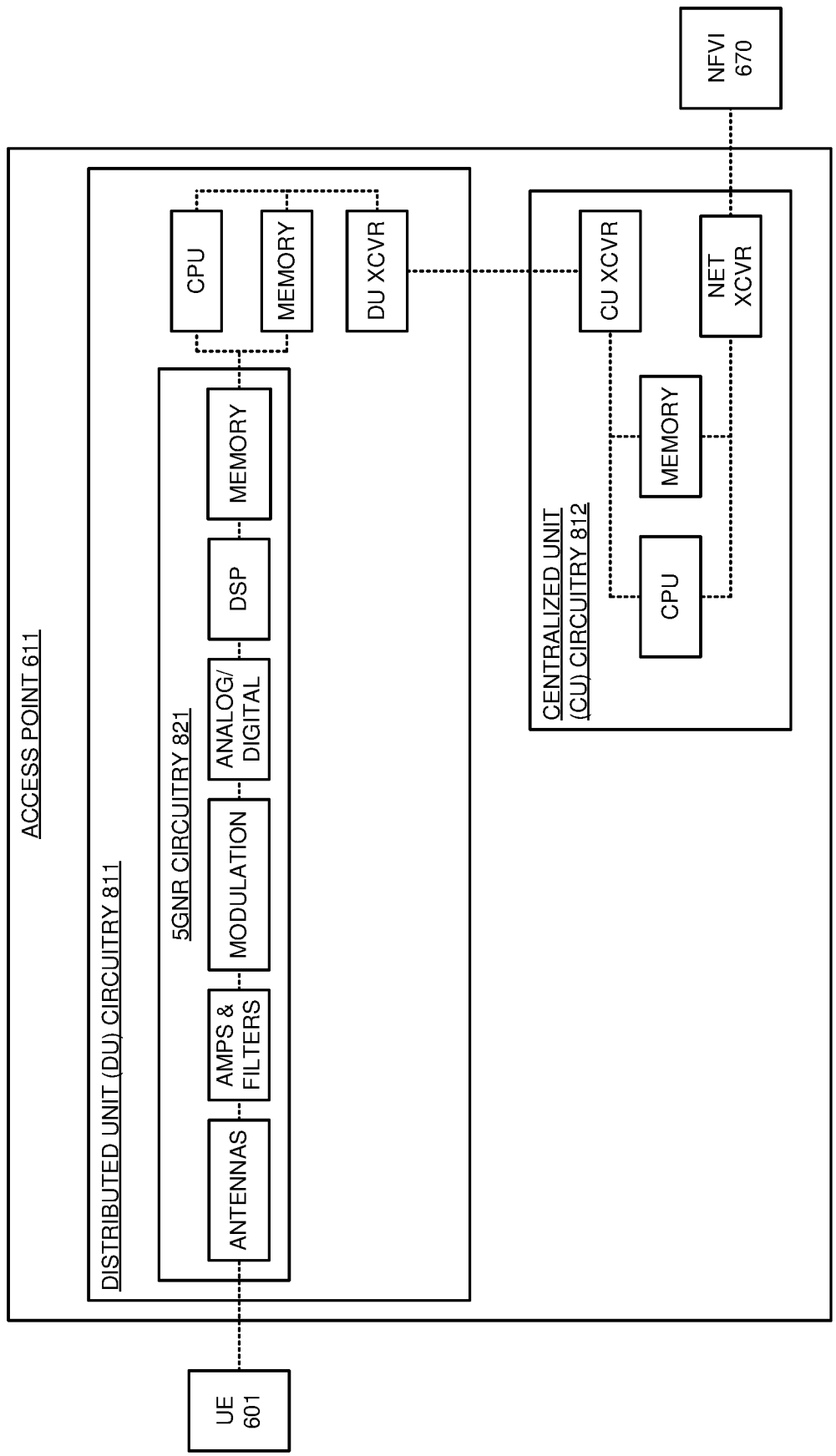
FIG. 8 illustrates an Access Point (AP) that serves the UE with the data communication services over co-located GW-Us.

FIG. 8 illustrates Access Point (AP) 611 that serves UE 601 with the data communication services over co-located GW-Us. AP 611 is an example of APs 111-113, although APs 111-113 may differ. AP 611 comprises Distributed Unit (DU) circuitry 811 and Centralized Unit (CU) circuitry 812. DU circuitry 811 comprises 5GNR circuitry 821, CPUs, memory, and transceivers (DU XCVR) that are coupled over bus circuitry. 5GNR circuitry 821 comprises antennas, amplifiers, filters, modulation, analog-to-digital interfaces, DSP, and memory that are coupled over bus circuitry. CU circuitry 812 comprises CPU, memory, and transceivers that are coupled over bus circuitry.

UE 601 is wirelessly coupled to the antennas in 5GNR circuitry 821 over the wireless 5GNR links. The DU transceivers in DU circuitry 821 are coupled to the CU transceivers in CU circuitry 812 over network data links. The network transceivers in CU circuitry 812 are coupled to NFVI 670 over N2 links and N3 links.

In DU circuitry 811, the memories store operating systems and network applications. The network applications include at least some of: PHY, MAC, RLC, PDCP, RRC, and SDAP. In CU circuitry 812, the memories store operating systems, virtual components, and network applications. The virtual components comprise hypervisor modules, virtual switches, virtual machines, and/or the like. The network applications comprise at least some of: PHY, MAC, RLC, PDCP, RRC, and SDAP.

The CPU in CU circuitry 712 executes some or all of the 5GNR network applications to drive the exchange of 5GNR data and signaling between UE 601 and NFVI 670. The CPU in DU circuitry 811 executes some or all of the 5GNR network applications to drive the exchange of 5GNR data and signaling between UE 601 and NFVI 670. The functionality split of the 5GNR network applications between DU circuitry 811 and CU circuitry 812 may vary.

In some examples, DU circuitry 811 and/or CU circuitry 812 host GW-Us, GW-Cs, APP DNS, OP DNS, DNS controllers, MME, AMF, or some other VNFs in the same manner as NFVI 670. AGW-U and E-GWs that are hosted by DU circuitry 811 and/or CU circuitry 812 qualify as co-located edge GW-Us.

In 5GNR circuitry 821, the antennas receive wireless signals from UE 601 that transport UL 5GNR data and RRC/N1 signaling. The RRC/N1 signaling may indicate network data like LBO, NR, EN, or DC. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL 5GNR symbols from the UL digital signals. In DU circuitry 811 and/or CU circuitry 812, the CPUs execute the 5GNR network applications to process the UL 5GNR symbols to recover the UL RRC/N1 signaling and 5GNR data. The network applications process the UL RRC/N1 signaling, UL 5GNR data, DL N2/N1 signaling, and DL N3 data to generate DL RRC/N1 signaling, DL 5GNR data, UL N2/N1 signaling, and UL N3 data. In CU circuitry 412, the network transceivers transfer the UL N2/N1 signaling and UL N3 data to NFVI 670 over the N2 and N3 links. The UL N2/N1 signaling may indicate network data for UE 601 like LBO, NR, EN, or DC. The UL N3 data may implement a service like LBO, NR, EN, or DC.

In CU circuitry 412, the network transceivers receive the DL N2/N1 signaling and DL N3 data from NFVI 670 over the N2 and N3 links. The DL N2/N1 signaling and N3 data may implement a service like LBO, NR, EN, or DC. In DU circuitry 811 and/or CU circuitry 812, the CPUs execute the 5GNR network applications to process the DL N2/N1 signaling and N3 data to generate the DL RRC/N1 signaling and the DL 5GNR data. The network applications process the DL RRC/N1 signaling and DL 5GNR data to generate DL 5GNR symbols. In DU circuitry 811, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL RRC/N1 signaling and 5GNR data to UE 601 over the 5GNR links.

The RRC exchanges the N2/N1 signaling with MME 640 in NFVI 670. The SDAP exchanges N3 data with an SGW-U in NFVI 670. The RRC maps between the N2/N1 signaling and Service Data Units (SDUs). The SDAP maps between the N3 data and SDUs. The RRC and SDAP exchanges their SDUs with the PDCP. The PDCP maps between the SDUs and PDUs. The PDCP exchanges the PDUs with the RLC. The RLC maps between the PDUs and MAC logical channels. The RLC exchanges the RRC/N1 signaling and 5GNR data with the MAC over the MAC logical channels. The MAC maps between the MAC logical channels and MAC transport channels. The MAC exchanges RRC/N1 signaling and 5GNR data with the PHYs over the MAC transport channels. The PHYs maps between the MAC transport channels and PHY transport channels. The PHY exchanges the RRC/N1 signaling and 5GNR data with the PHYs in the UE 601 over the PHY transport channels in the 5GNR wireless links.

RRC functions comprise authentication, security, handover control, status reporting, QoS, network broadcasts and pages, and network selection. SDAP functions comprise QoS marking and flow control. PDCP functions comprise security ciphering, header compression and decompression, sequence numbering and re-sequencing, de-duplication. RLC functions comprise ARQ, sequence numbering and resequencing, segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/ removal, interleaving/de-interleaving, FEC encoding/ decoding, rate matching/de-matching, scrambling/ descrambling, modulation mapping/de-mapping, channel estimation/equalization, FFTs/IFFTs, channel coding/decoding, layer mapping/de-mapping, precoding, DFTs/IDFTs, and RE mapping/de-mapping.

Figure 9:
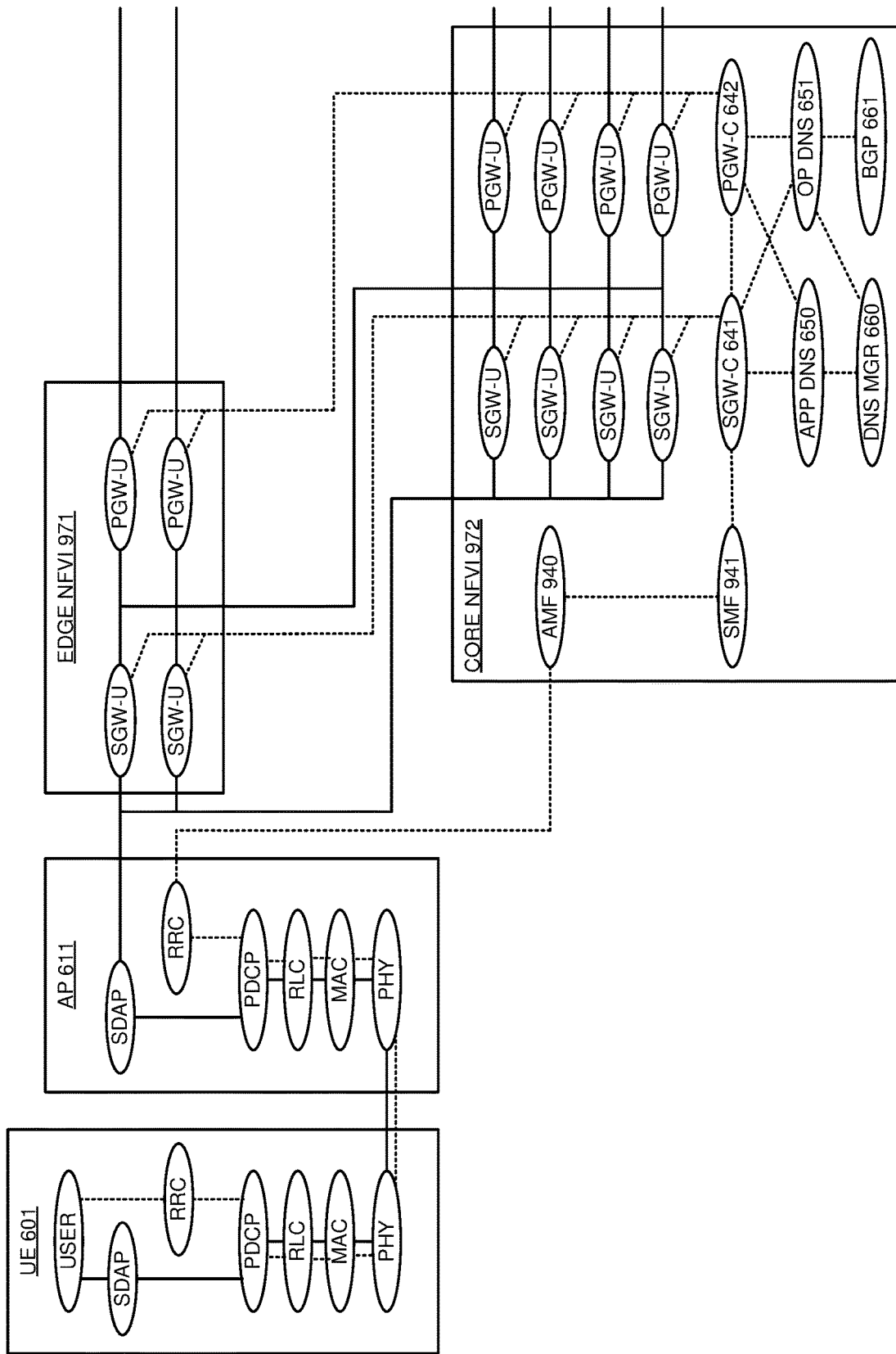
FIG. 9 illustrates the operation of the UE, AP, and NFVI to serve the UE with the data communication services over co-located edge GW-Us.

FIG. 9 illustrates the operation of UE 601, AP 611, and NFVIs 971-972 to serve UE 601 with special communication services over co-located GW-Us. NFVIs 971-972 are configured and operate like NFVI 670. The GW-Us in edge NFVI 971 are co-located edge GW-Us. The GW-Us in core NFVI 972 form integrated SAE GW-Us for dedicated SAE core services. AMF 940 replaces MME 640.

The RRC in UE 601 and the RRC in AP 611 exchange 5GNR RRC/N1 signaling over their respective PDCPs, RLCs, MACs, and PHYs. The RRC in AP 611 and AMF 940 in core NFVI 672 exchange corresponding 5GNR N2/N1 signaling. AMF 940 interacts with UE 601 over N1 and with other VNFs like AUSF and UDM to perform UE authentication and security. AMF 940 interacts with UE 601 over N1 and with other VNFs like PCF and SMF 941 to perform service selection. AMF 940 and SMF 941 select bearers and QoS for the selected service. In response to bearer and QoS selection, SMF 941 transfers N4 signaling to SGW-C 641 that indicates the selected bearers, QoS, and other information for the selected service for UE 601.

In response to the N4 signaling, SGW-C 641 selects network data like LBO, NR, EN, or DC based on the selected service. For example, SGW-C 641 may select LBO for an internet-access service or select DC for an SAE core service. SGW-C 641 generates a DNS message that requests a translation of the AP 611 ID into an SGW-U ID using the included network data. SGW-C 641 transfers the DNS message to APP DNS 650. In response to the DNS message, APP DNS 650 uses DDDS to translate the AP 611 ID into an SGW-U ID using the included network data. If the network data indicates LBO or NR low-latency, then APP DNS 650 translates the AP 611 ID into an SGW-U ID for an SGW-U in edge NFVI 971. If the network data indicates DC, then APP DNS 650 translates the AP 611 ID into an SGW-U ID for an SGW-U in an SAE core in NFVI 972. APP DNS 650 transfers a DNS response indicating the selected SGW-U ID to SGW-C 641.

In response to the DNS response, SGW-C 641 signals the session formation to PGW-C 642. In response to the session information, PGW-C 642 generates a DNS message that requests a translation of the SGW-U ID into a PGW-U ID using the network data. PGW-C 642 transfers the DNS message to APP DNS 650. In response to the DNS message, APP DNS 650 uses DDDS to translate the SGW-U ID into a PGW-U ID using the network data. If the network data indicates LBO or NR low-latency, then APP DNS 650 translates the SGW-U ID into a PGW-U ID for a PGW-U in edge NFVI 971. If the network data indicates DC, then APP DNS 650 translates the SGW-U ID into a PGW-U ID for a PGW-U in the SAE core in NFVI 972.

APP DNS 650 transfers a DNS response indicating the selected PGW-U ID to PGW-C 641. In some examples, SGW-C 641 sends both DNS messages and shares the results with PGW-C 642. For example, SGW-C 641 may send both DNS messages when DC is indicated and indicate the PGW-U ID to PGW-C 642. SGW-C 641 transfers session control signaling for UE 601 to the selected SGW-U using the selected SGU-U ID. PGW-C 642 transfers session control signaling for UE 601 to the selected PGW-U using the selected PGU-U ID.

SGW-C 641 transfers N4 signaling to SMF 941 indicating the SGW-U ID and PGW ID, and SMF 941 signals the information to AMF 940. AMF 940 transfers N2/N1 signaling to the RRC in AP 611 that indicates the selected bearers, SGW-U ID, and QoS. The RRC in AP 611 receives the response signaling and configures its network applications to communicate with UE 601 and the selected SGW-U. The RRC in AP 611 transfers RRC/N1 signaling to the RRC in UE 601 over their respective PDCPs, RLCs, MACs, and PHYs directing UE 601 to communicate with AP 611. In UE 601, the RRC configures its 5GNR network applications to communicate with AP 611. The RRC in AP 611 transfers N2/N1 signaling to AMF 960 indicating UE acceptance, and SMF 961 directs SGW-C 641 and PGW-C 642 to activate the bearers in the selected SGW-U and PGW-U that serve UE 601.

The SDAP in UE 601 and the SDAP in AP 611 wirelessly exchange user data over their respective PDCPs, RLCs, MACs, and PHYs to support the network service. AP 611 and the selected SGW-U exchange the user data to support the network service. The selected SGW-U and the selected PGW-U exchange the user data to support the network service. In some cases, the selected PGW-U and the external systems exchange the user data to support the network service. In other cases, the selected PGW-U and another PGW-U or SGW-U for another UE exchange the user data to support the network service. The co-located SGW-Us and PGW-Us in edge NFVI 971 could be used to deliver excellent LBO and NR low-latency services to UE 601. The co-located SGW-Us and PGW-Us in core NFVI 972 could be used to deliver excellent dedicated SAE core services to UE 601.

Before APP DNS 650 has the above translations for AP 611, UE 601 (or another UE) wirelessly attaches to AP 611, and AP 611 transfers a session request to AMF 940. AMF 940 authenticates, authorizes, selects a service for UE 601. SMF 941 transfers a create session request to SGW-C 641. SGW-C 641 transfers a DNS message to APP DNS 650 that requests translation of the AP 611 ID into an SGW-U ID using network data. Since the translations for AP 611 are missing in this example, APP DNS 650 transfers a DNS response that indicates a translation fault for AP 611 to SGW-C 641.

SGW-C 641 receives the DNS response that indicates the translation fault for AP 611. In response, SGW-C 641 transfers a translation fault notice that indicates the TAI for UE 601, the AP ID for AP 611, and processing instructions for network codes like LBO, NR, EN, and DC. DNS controller 660 receives the translation fault notice and transfers a translation request to OP DNS 651 that has the TAI for UE 601. OP DNS 651 receives the translation request and translates the TAI into SGW-U IDs and PGW-U IDs that serve the TAI. OP DNS 651 transfers a translation response that indicates the SGW-U IDs and the PGW-U IDs for the TAI.

DNS controller 660 receives the translation response and processes the SGW-U IDs and the PGW-U IDs against network topology data to determine co-located groups of the SGW-Us and PGW-Us. DNS controller 660 also determines whether the co-location is at the network edge or in an SAE GW. To determine edge and core co-location, BGP listener 661 monitors network traffic to discover communication links between AP 611, the SGW-Us, and the PGW-Us. DNS controller 660 then enters a network topology database to identify geographic information for AP 611 and the detected SGW-Us and PGW-Us. The geographic information could be geographic coordinates, location IDs, NFVI IDs, and/or the like. DNS controller 660 processes the geographic information for AP 611, the SGW-Us, and the PGW-Us to detect co-located SGW-Us and PGW-Us. DNS controller 660 also processes the geographic information to detect AP 611 proximity and SAE core proximity.

To indicate edge co-location where detected, DNS controller 660 adds a shared location ID like "EDGE611" to the co-located SGW-U IDs and PGW-U IDs in edge NFVI 971 that is near AP 611. DNS controller 660 adds "SAE972" to the co-located SGW-U IDs and PGW-U IDs in core NFVI 972. Per the service instructions, DNS controller 660 also adds network data (like LBO, NR, EN, or DC) to the translations to branch the translations for AP 611 based on the network data. For example, LBO and NR nodes translate the AP 611 ID into co-located edge GW-Us when LBO or NR network data is provided. DC nodes translate the AP 611 ID into SAE core GW-Us when DC network data is provided. DNS controller 660 transfers the translations for AP 611 to APP DNS 650. APP DNS 650 may now use the translations to serve UE 601 and other UEs over AP 611 with optimized services like LBO, NR, EN, and DC.

Figure 10:
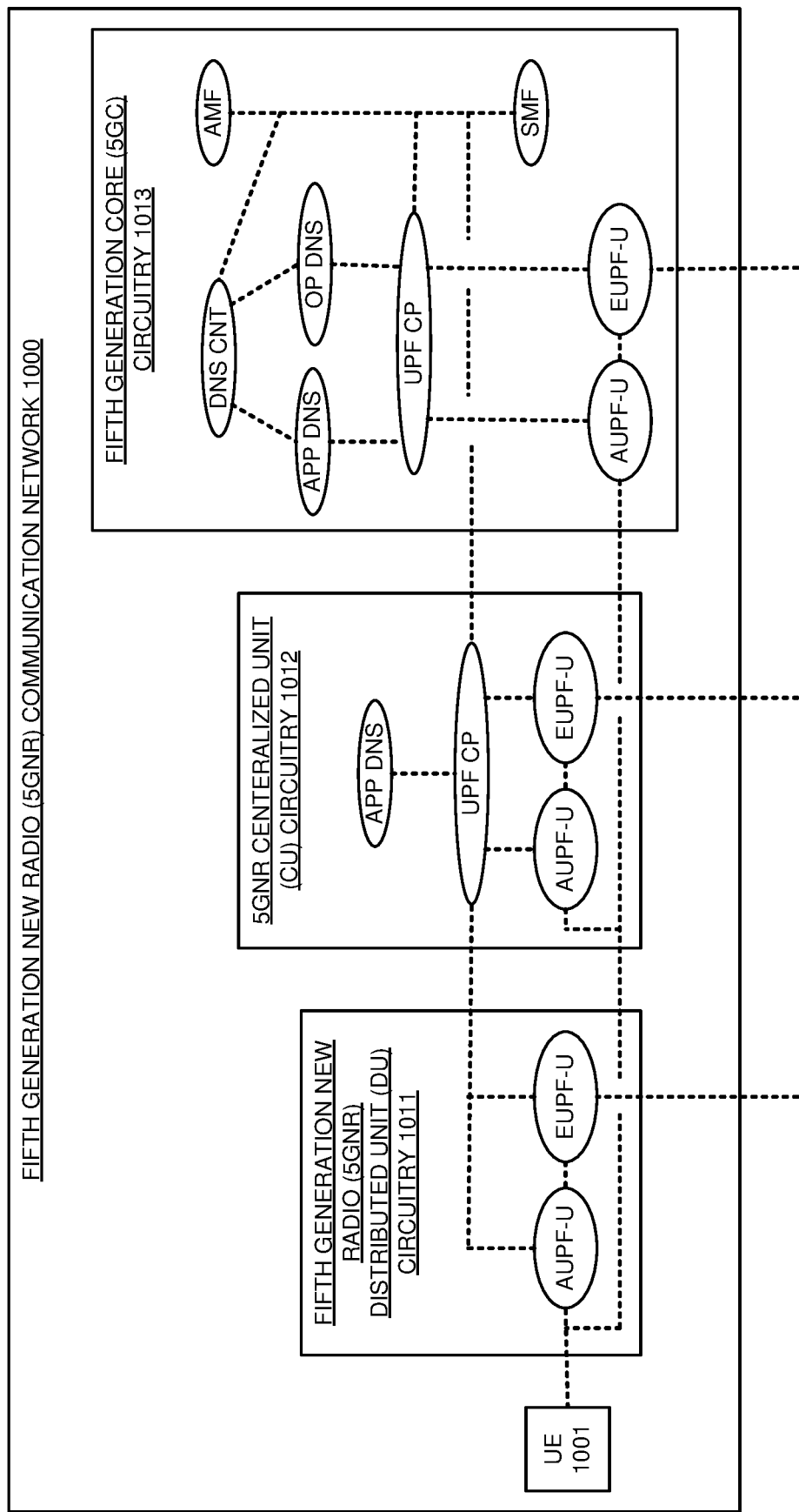
FIG. 10 illustrates a Fifth Generation New Radio (5GNR) communication network to serve a UE with data communication services over co-located edge User Plane Functions (UPFs).

FIG. 10 illustrates Fifth Generation New Radio (5GNR) communication network 1000 to serve UE 1001 with data communication services over co-located 5G User Plane Functions (UPFs). 5GNR communication network 1000 comprises an example of wireless communication network 100 although network 100 may differ. 5GNR communication network 1000 comprises UE 1001, 5GNR DU circuitry 1011, 5GNR CU circuitry 1012, and 5G Core (5GC) circuitry 1013. 5GC circuitry 1013 comprises a DNS controller, APP DNS, OP DNS, AMF, SMF, User Plane Function Control Plane (AUPF CP), Access UPF User Plane (AUPF-U), and External UPF User Plane (EUPF-U). 5GNR CU circuitry 1012 comprises an APP DNS, UPF CP, AUPF-U, and EUPF-U. 5GNR DU circuitry 1011 comprises an AUPF-U and EUPF-U. The AUPF-U and EUPF-U in DU circuitry 1011 are co-located edge GW-Us. The AUPF-U and EUPF-U in CU circuitry 1012 are also co-located edge GW-Us. The AUPF-U and EUPF-U in 5GC circuitry 1013 form an integrated SAE GW-U in a dedicated SAE core.

UE 1001 and 5GNR DU circuitry 1011 exchange 5GNR RRC/N1 signaling over wireless 5GNR links. 5GNR DU circuitry 1011 and 5GNR CU circuitry 1012 exchange 5GNR signaling over fronthaul links. 5GNR CU circuitry 1012 and the AMF in 5GC circuitry 1013 exchange 5GNR N1/N2 signaling over backhaul links. The AMF interacts with UE 1001 over the N1 signaling authenticate and authorize UE 1001. The AMF and SMF interact with UE 1001 over N1 and with other VNFs to select a service. The AMF and SMF select bearers and QoS for the selected service. In response to an edge service selection, the SMF transfers N4 signaling to the UPF CP in 5GNR CU circuitry 1012 that indicates the selected bearers, QoS, and other information for the selected service for UE 601.

In response to the N4 signaling, the UPF CP in CU circuitry 1012 selects network data like LBO, NR, EN, or DC based on the selected edge service. The UPF CP in CU circuitry 1012 generates a DNS message that requests a translation of the ID for 5GNR DU 1011 and/or CU circuitry 1012 into an AUPF-U ID using the included network data. The UPF CP in CU circuitry 1012 transfers the DNS message to the APP DNS in CU circuitry 1012. In response to the DNS message, the APP DNS uses DDDS to translate the ID for DU circuitry 1011 and/or CU circuitry 1012 into an AUPF-U ID using the included network data. For edge 5GNR low-latency between 5GNR UEs, the APP DNS in CU circuitry 1012 translates the DU/CU ID into an AUPF-U ID for an AUPF-U in DU circuitry 1011. For edge LBO, DC, or EN the APP DNS in CU circuitry 1012 translates the DU/CU ID into an AUPF-U ID for an AUPF-U in CU circuitry 1012.

In response to the DNS response, the UPF CP in CU circuitry 1012 generates another DNS message that requests a translation of the AUPF-U ID into a EUPF-U ID using the network data. The UPF CP transfers the DNS message to APP DNS 650 in CU circuitry 1012. In response to the DNS message, the APP DNS uses DDDS to translate the AUPF-U ID into an EUPF-U ID using the network data. For an edge low-latency NR between UEs, the APP DNS translates the AUPF-U ID into an EUPF-U ID for an EUPF-U in DU circuitry 1011. For edge LBO, DC, or EN the APP DNS in CU circuitry 1012 translates the DU/CU ID into an AUPF-U ID for an AUPF-U in CU circuitry 1012.

The APP DNS in CU circuitry 1012 transfers a DNS response indicating the selected EUPF-U ID to the UPF CP in CU circuitry 1012. The UPF CP in CU circuitry 1012 transfers N4 signaling to the SMF indicating the AUPF-U ID and the EUPF-U ID, and the SMF signals the information to the AMF. The AMF transfers N2/N1 signaling to CU circuitry 1011 that indicates the selected bearers, AUPF-U ID, EUPF-U ID, and QoS. 5GNR DU circuitry 1011 and/or CU circuitry 1012 receive the N2/N1 signaling and configure the network applications to communicate with UE 1001 and the selected AUPF-U. 5GNR DU circuitry 1011 and/or CU circuitry 1012 signal UE 1001 to communicate with DU circuitry 1012. UE 1001 configures its 5GNR network applications to communicate with DU circuitry 1011. 5GNR DU circuitry 1011 and/or CU circuitry 1012 transfer N2/N1 signaling to the AMF indicating UE acceptance, and the SMF directs the UPF CP in CU circuitry 1012 to activate the bearers that serve UE 1001. The UPF CP in CU circuitry 1012 directs the selected AUPF-U and EUPF-U to serve UE 1001 with the QoS over the bearers.

UE 601 and the DU circuitry 1011 wirelessly exchange user data to support the network service. DU circuitry 1011 and the AUPF in DU circuitry 1011 or CU circuitry 1012 exchange the user data to support the network service. The AUPF in DU circuitry 1011 or CU circuitry 1012 and the AUPF in DU circuitry 1011 or CU circuitry 1013 exchange the user data to support the network service. The EUPF in DU circuitry 1011 or CU circuitry 1012 and external systems, AUPFs, or EUPFs exchange the user data to support the network service. The co-located AUPF-Us and EUPF-Us in DU circuitry 1011 and CU circuitry 1012 deliver excellent LBO and NR low-latency services to UE 1001.

In response to an SAE core service selection, the SMF transfers N4 signaling to the UPF CP in 5GC circuitry 1013 that indicates the selected bearers, QoS, and other information for the selected service for UE 601. The UPF CP in 5GC circuitry 1013 selects network data like NR, EN, or DC based on the selected core service. The UPF CP in 5GC circuitry 1013 generates a DNS message that requests a translation of the ID for 5GNR DU circuitry 1011 and/or CU circuitry 1012 into an AUPF-U ID using the included network data. The UPF CP transfers the DNS message to the APP DNS 5GC circuitry 1013. The APP DNS uses DDDS to translate the ID for DU circuitry 1011 and/or CU circuitry 1012 into an AUPF-U ID using the included network data. For core NR, EN, or DC, the APP DNS in 5GC circuitry 1013 translates the DU/CU ID into an AUPF-U ID for an AUPF-U in 5GC core circuitry 1013. The APP DNS uses DDDS to translate the AUPF-U ID into an EUPF-U ID in 5GC core circuitry 1013 using the network data. For core NR, EN, or DC, the APP DNS translates the AUPF-U ID into an EUPF-U ID for an EUPF-U in 5GC circuitry 1013. The AUPF-U and EPF-U in 5GC circuitry 1013 exchange the user data to support the selected core service.

Before the APP DNS in CU circuitry 1012 or 5GC circuitry 1013 has the above translations for DU circuitry 1011 and/or CU circuitry 1012, UE 1001 (or another UE) wirelessly attaches to DU circuitry 1011, and CU circuitry 1012 transfers a session request to the AMF. The AMF authenticates, authorizes, selects a service for UE 1001. The SMF transfers a create session request to a UPF CP. The UPF CP transfers a DNS message that requests translation of the DU/CU ID into an AUPF-U using the network data. Since the translations is missing in this example, the APP DNS transfers a DNS response that indicates a translation fault for the DU/CU ID.

The UPF CP receives the DNS response that indicates the translation fault. In response, UPF CP transfers a translation fault notice that indicates the TAI for UE 1001, the DU/CU ID, and processing instructions for network codes like LBO, NR, EN, and DC. The DNS controller receives the translation fault notice and transfers a translation request to the OP DNS that has the TAI for UE 1001. The OP DNS receives the translation request and translates the TAI into AUPF-U IDs and EUPF-U IDs. The OP DNS transfers a translation response that indicates the AUPF-U IDs and EUPF-U IDs for the TAI of UE 1001.

The DNS controller receives the translation response and processes the AUPF-U IDs and the EUPF-U IDs against network topology data to determine co-located groups of the AUPF-Us and EUPF-Us. The DNS controller also determines whether the co-location is at the network edge or in an SAE GW. To determine co-location at the edge or in an SAE core, the DNS controller uses a BGP listener to monitor network traffic and discover communication links between the SDAP in DU circuitry 1011 or CU circuitry 1012 and the AUPF-Us, and between the AUPF-Us and the EUPF-Us. The DNS controller enters a topology database to identify geographic data for DU circuitry 1011, CU circuitry 1012, 5GC circuitry 1013, and the detected AUPF-Us and EUPF-Us. The geographic information could be geographic coordinates, location IDs, NFVI IDs, and/or the like. The DNS controller processes the geographic information for DU circuitry 1011, CU circuitry 1012, 5GC circuitry 1013, and the detected AUPF-Us and EUPF-Us to detect co-located AUPF-Us and EUPF-Us. The DNS controller also processes the geographic information to detect edge proximity to DU circuitry 1011 and/or CU circuitry 1012.

To indicate edge co-location where detected, the DNS controller adds a shared location ID like "DU1011" or "CU1012" to the co-located AUPF-U IDs and EUPF-U IDs in DU circuitry 1011 or CU circuitry 1012. Per the service instructions, the DNS controller also adds network data (like LBO, NR, EN, or DC) to branch the translations for the DU/CU ID based on the network data. For example, LBO and NR nodes are added to translate the DU/CU ID into co-located edge UPF-Us when LBO or NR low-latency is indicated. DC nodes are added to translate the DU/CU ID into SAE UPF-U IDs when DC is indicated. The DNS controller transfers the translations for the DU/CU ID to the APP DNS in CU circuitry 1012 and in 5GC circuitry 1013. Both APP DNS may now use the translations to serve UE 1001 and other UEs over DU circuitry 1011, CU circuitry 1012, and 5GC circuitry 1013 with optimized services like LBO, NR, EN, and DC.

The wireless data network circuitry described above comprises computer hardware and software that form special-purpose wireless network circuitry to wirelessly serve UEs with wireless communication services over co-located edge gateways. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to wirelessly serve UEs with wireless communication services over co-located edge gateways.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to use co-located User Plane Functions (UPFs), the method comprising:
   a control-plane function receiving a session request for a User Equipment (UE) over a wireless access point that has a wireless access point Identifier (ID) and responsively transferring a co-located UPF request for the wireless access point ID to a naming system;
   the naming system receiving the co-located UPF request, and in response, detecting a co-location translation fault for the wireless access point ID and transferring the wireless access point ID to a translation controller;
   the translation controller receiving the wireless access point ID, and in response, determining a set of co-located UPFs for the wireless access node point and transferring co-location translation information for the wireless access point ID and a set of co-located UPF IDs for the set of co-located UPFs to the naming system;

the control-plane function receiving another session request for another UE over the wireless access point and responsively transferring another co-located UPF request for the wireless access point ID to the naming system;

the naming system receiving the other co-located UPF request and translating the wireless access point ID into the set of co-located UPF IDs and transferring the set of the co-located UPF IDs to the control-plane function; and the control-plane function receiving the set of the co-located UPF IDs and signaling the set of the co-located UPFs to serve the UE over the wireless access point.

2. The method of claim 1 wherein the translation controller transferring the co-location translation information to the naming system comprises generating the translation information having location IDs in the co-located UPF IDs.

3. The method of claim 1 wherein the translation controller transferring the co-location translation information to the naming system comprises generating the translation information having a common location ID in the co-located UPF IDs.

4. The method of claim 1 wherein the translation controller transferring the co-location translation information to the naming system comprises generating the translation information having an edge location ID in the co-located UPF IDs.

5. The method of claim 1 wherein the control-plane function signaling the set of the co-located UPFs to serve the UE over the wireless access point comprises signaling the set of the co-located UPFs to serve a Fifth Generation New Radio (5GNR) low-latency service to the UE.

6. The method of claim 1 wherein the control-plane function signaling the set of the co-located UPFs to serve the UE over the wireless access point comprises signaling the set of the co-located UPFs to serve a Local Breakout (LBO) service to the UE.

7. The method of claim 1 wherein the naming system comprises a Domain Name System (DNS).

8. The method of claim 1 wherein the control-plane function comprises an Access and Mobility Management Function (AMF).

9. The method of claim 1 wherein the control-plane function comprises a Mobility Management Entity (MME).

10. The method of claim 1 wherein:
the control-plane function comprises a System Architecture Evolution Gateway (SAE GW) control-plane; and
the set of the co-located UPFs comprise a System Architecture Evolution Gateway (SAE GW) user-plane.

11. A wireless communication network to use co-located User Plane Functions (UPFs), the wireless communication network comprising:
a control-plane function configured to receive a session request for a User Equipment (UE) over a wireless access point that has a wireless access point Identifier (ID) and responsively transfer a co-located UPF request for the wireless access point ID to a naming system;
the naming system configured to receive the co-located UPF request, and in response, detect a co-location translation fault for the wireless access point ID and transfer the wireless access point ID to a translation controller;
the translation controller configured to receive the wireless access point ID, and in response, determine a set of the co-located UPFs for the wireless access point and transfer co-location translation information for the wireless access point ID and a set of co-located UPF IDs for the set of co-located UPFs to the naming system;
the control-plane function configured to receive another session request for another UE over the wireless access point and responsively transfer another co-located UPF request for the wireless access point ID to the naming system;
the naming system configured to receive the other co-located UPF request and translate the wireless access point ID into the set of co-located UPF IDs and transfer the set of the co-located UPF IDs to the control-plane function; and
the control-plane function configured to receive the set of the co-located UPF IDs and signal the set of the co-located UPFs to serve the UE over the wireless access point.

12. The wireless communication network of claim 11 wherein the translation controller is configured to generate the translation information having location IDs in the co-located UPF IDs.

13. The wireless communication network of claim 11 wherein the translation controller is configured to generate the translation information having a common location ID in the co-located UPF IDs.

14. The wireless communication network of claim 11 wherein the translation controller is configured to generate the translation information having an edge location ID in the co-located UPF IDs.

15. The wireless communication network of claim 11 wherein the control-plane function is configured to signal the set of the co-located UPFs to serve a Fifth Generation New Radio (5GNR) low-latency service to the UE.

16. The wireless communication network of claim 11 wherein the control-plane function is configured to signal the set of the co-located UPFs to serve a Local Breakout (LBO) service to the UE.

17. The wireless communication network of claim 11 wherein the naming system comprises a Domain Name System (DNS).

18. The wireless communication network of claim 11 wherein the control-plane function comprises an Access and Mobility Management Function (AMF).

19. The wireless communication network of claim 11 wherein the control-plane function comprises a Mobility Management Entity (MME).

20. The wireless communication network of claim 11 wherein:
the control-plane function comprises a System Architecture Evolution Gateway (SAE GW) control-plane; and
the set of the co-located UPFs comprise a System Architecture Evolution Gateway (SAE GW) user-plane.

* * * * *